United States Patent
Liu et al.

(10) Patent No.: US 11,832,322 B2
(45) Date of Patent: Nov. 28, 2023

(54) WIRELESS BACKHAUL COMMUNICATION PROCESSING METHOD AND RELATED DEVICE

(71) Applicant: Huawei Technologies Co., Ltd., Shenzhen (CN)

(72) Inventors: Jing Liu, Shanghai (CN); Mingzeng Dai, Shenzhen (CN); Yuanping Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/994,026

(22) Filed: Aug. 14, 2020

(65) Prior Publication Data
US 2020/0374958 A1    Nov. 26, 2020

Related U.S. Application Data

(63) Continuation of application No. PCT/CN2019/074401, filed on Feb. 1, 2019.

(30) Foreign Application Priority Data

Feb. 14, 2018 (CN) .......................... 201810153124.1

(51) Int. Cl.
*H04W 76/15* (2018.01)
*H04W 8/24* (2009.01)
*H04W 88/08* (2009.01)

(52) U.S. Cl.
CPC ............. *H04W 76/15* (2018.02); *H04W 8/24* (2013.01); *H04W 88/08* (2013.01)

(58) Field of Classification Search
CPC ........ H04W 76/15; H04W 8/24; H04W 88/08

USPC .................................................. 370/328–329
See application file for complete search history.

(56) References Cited

U.S. PATENT DOCUMENTS

| 2015/0173047 | A1 | 6/2015 | Yamada | |
|---|---|---|---|---|
| 2015/0201383 | A1* | 7/2015 | Papasakellariou | .. H04W 52/146 455/562.1 |
| 2016/0212790 | A1* | 7/2016 | Fujishiro | ................. H04L 45/24 |
| 2017/0331577 | A1* | 11/2017 | Parkvall | ............... H04B 7/0848 |

(Continued)

FOREIGN PATENT DOCUMENTS

| CN | 103731842 A | 4/2014 |
|---|---|---|
| CN | 104105221 A | 10/2014 |

(Continued)

OTHER PUBLICATIONS

"Chairman Notes," 3GPP TSG-RAN WG2 NR Ad hoc 1801, Vancouver, Canada, XP051387099, pp. 1-91, 3rd Generation Partnership Project, Valbonne, France (Jan. 22-26, 2018).

(Continued)

*Primary Examiner* — Congvan Tran
(74) *Attorney, Agent, or Firm* — Leydig, Voit & Mayer, Ltd.

(57) ABSTRACT

Embodiments of this application provide a wireless backhaul communication processing method and a related device. In the method, after determining to add a secondary access device for a wireless backhaul device, a first network side device sends capability indication information about the wireless backhaul device to the secondary access device, so that the wireless backhaul device establishes a radio link to the secondary access device.

19 Claims, 13 Drawing Sheets

(56) References Cited

U.S. PATENT DOCUMENTS

| | | | | |
|---|---|---|---|---|
| 2018/0048442 | A1* | 2/2018 | Sang | H04L 5/0051 |
| 2018/0227282 | A1* | 8/2018 | Lee | H04W 12/06 |
| 2018/0270682 | A1* | 9/2018 | Zacharias | H04W 24/08 |
| 2018/0359790 | A1* | 12/2018 | Ingale | H04W 8/22 |
| 2019/0037417 | A1* | 1/2019 | Lei | H04W 72/542 |
| 2019/0132790 | A1* | 5/2019 | Lee | H04W 48/18 |
| 2019/0166576 | A1* | 5/2019 | Kim | H04W 36/08 |
| 2019/0182682 | A1* | 6/2019 | Kim | H04B 7/0695 |
| 2019/0253938 | A1* | 8/2019 | Sayenko | H04W 36/08 |
| 2019/0281645 | A1* | 9/2019 | Van Der Velde | H04L 5/00 |
| 2020/0154499 | A1* | 5/2020 | Futaki | H04W 8/22 |
| 2020/0267791 | A1* | 8/2020 | Yilmaz | H04W 76/16 |
| 2020/0344832 | A1* | 10/2020 | Hu | H04W 72/0453 |
| 2021/0298104 | A1* | 9/2021 | Akiyoshi | H04W 28/24 |

FOREIGN PATENT DOCUMENTS

| | | |
|---|---|---|
| CN | 104581680 A | 4/2015 |
| CN | 106162817 A | 11/2016 |
| JP | 2017503393 A | 1/2017 |
| RU | 2602981 C2 | 11/2016 |
| WO | 2016065068 A2 | 4/2016 |
| WO | 2017004255 A1 | 1/2017 |

OTHER PUBLICATIONS

"Support for EN-DC for IAB," 3GPP TSG-RAN WG2 NR AH1801, Vancouver, Canada, R2-1801023, pp. 1-3, 3rd Generation Partnership Project, Valbonne, France (Jan. 22-26, 2018).

"Consideration on IAB Scenarios and Use Cases," 3GPP TSG-RAN WG2 Ad Hoc, Vancouver, Canada, R2-1801603 (revision of R2-1801130), pp. 1-4, 3rd Generation Partnership Project, Valbonne, France (Jan. 22-26, 2017).

"NR Physical Layer design for IAB backhaul link," 3GPP TSG RAN WG1 Meeting #94bis, Chengdu, China, R1-1810538, total 7 pages, 3rd Generation Partnership Project, Valbonne, France (Oct. 8-12, 2018).

"3rd Generation Partnership Project; Technical Specification Group Radio Access Network; Evolved Universal Terrestrial Radio Access (E-UTRA); Base Station (BS) radio transmission and reception(Release 15)," 3GPP TS 36.104 V15.1.0, total 277 pages, 3rd Generation Partnership Project, Valbonne, France (Dec. 2017).

"3rd Generation Partnership Project; Technical Specification Group Radio Access Network; Evolved Universal Terrestrial Radio Access (E-UTRA);Physical channels and modulation(Release 15)," 3GPP TS 36.211 V15.0.0, total 219 pages, 3rd Generation Partnership Project, Valbonne, France (Dec. 2017).

"3rd Generation Partnership Project; Technical Specification Group Radio Access Network; Evolved Universal Terrestrial Radio Access (E-UTRA); Medium Access Control (MAC) protocol specification(Release 15)," 3GPP TS 36.321 V15.0.0, total 109 pages, 3rd Generation Partnership Project, Valbonne, France (Dec. 2017).

"3rd Generation Partnership Project; Technical Specification Group Radio Access Network; Evolved Universal Terrestrial Radio Access (E-UTRA);Radio Resource Control (RRC);Protocol specification(Release 15)," 3GPP TS 36.331 V15.0.1, total 776 pages, 3rd Generation Partnership Project, Valbonne, France (Jan. 2018).

"3rd Generation Partnership Project; Technical Specification Group Radio Access Network; Evolved Universal Terrestrial Radio Access Network(E-UTRAN);X2 application protocol (X2AP)(Release 15)," 3GPP TS 36.423 V15.0.0, total 350 pages, 3rd Generation Partnership Project, Valbonne, France (Dec. 2017).

"3rd Generation Partnership Project; Technical Specification Group Radio Access Network; Evolved Universal Terrestrial Radio Access (E-UTRA) and NR;Multi-connectivity;Stage 2(Release 15)," 3GPP TS 37.340 V1.1.0, total 44 pages, 3rd Generation Partnership Project, Valbonne, France (Oct. 2017).

"3rd Generation Partnership Project; Technical Specification Group Radio Access Network; NR; NR and NG-RAN Overall Description; Stage 2(Release 15)," 3GPP TS 38.300 V1.1.0, total 59 pages, 3rd Generation Partnership Project, Valbonne, France (Oct. 2017).

"3rd Generation Partnership Project; Technical Specification Group Radio Access Network NR Radio Resource Control (RRC) protocol specification(Release 15)," 3GPP TS 38.331 V15.0.0 , total 188 pages, 3rd Generation Partnership Project, Valbonne, France (Dec. 2017).

"3rd Generation Partnership Project; Technical Specification Group Radio Access Network; NG-RAN;F1 application protocol (F1AP)(Release 15)," 3GPP TS 38.473 V15.0.0, total 90 pages, 3rd Generation Partnership Project, Valbonne, France (Dec. 2017).

"Scenario and architecture for IAB," 3GPP TSG RAN WG2 Meeting #AH 1801, R2-1800953, Vancouver, Canada, pp. 1-5, 3rd Generation Partnership Project, Valbonne, France (Jan. 22-26, 2018).

* cited by examiner

WIRELESS BACKHAUL COMMUNICATION PROCESSING METHOD AND RELATED DEVICE

CROSS-REFERENCE TO RELATED APPLICATIONS

This application is a continuation of International Application No. PCT/CN2019/074401, filed on Feb. 1, 2019, which claims priority to Chinese application No. 201810153124.1 filed on Feb. 14, 2018. The disclosures of the aforementioned applications are hereby incorporated by reference in their entireties.

TECHNICAL FIELD

Embodiments of this application relate to the field of wireless communications, and in particular, to a wireless backhaul communication processing technology.

BACKGROUND

In a wireless communications system, a wireless backhaul device forwards and amplifies a radio signal sent to a network side device (e.g., a base station) or received from the network side device, to extend signal coverage and increase a signal-to-noise ratio of a terminal side device when a terminal side device is located at an edge of the signal coverage, thereby improving data transmission quality.

In Release 10 of the specification formulated by the 3rd generation partnership project (3GPP) for a long term evolution (LTE) wireless communications system, as shown in FIG. 1, after being powered on, a wireless backhaul device first establishes, as a common terminal side device, a connection to a network side device through a random access process, to obtain a list of all cells that the wireless backhaul device is allowed to access. Then, the wireless backhaul device disconnects from the current network side device, selects a cell from the list and re-initiates random access, and when a connection is established, sends indication information to a network side device to which the cell belongs. The indication information is used to indicate that a wireless backhaul device accesses the network side device, and request the network side device to perform transmission time unit configuration for a radio link of the wireless backhaul device. In addition, the wireless backhaul device further triggers establishment of an X2 interface and an S1 interface with the network side device. After accessing a network, the wireless backhaul device obtains a cell identifier from an operations, administration, and maintenance (OAM) system of the wireless backhaul device, so that the wireless backhaul device serves as a cell of the network side device to provide signal coverage for the terminal side device.

In Release 15 of the 3GPP specification, a first discussed deployment scenario of a new radio (NR) communications system (also referred to as a 5G system) is a non-standalone deployment scenario. To be specific, a first network side device (e.g., an LTE base station) serves as a primary access device, and a second network side device (e.g., a non-standalone NR base station) serves as a secondary access device, to implement a dual connectivity capability (i.e., connecting to at least two network side devices) of the terminal side device. In the non-standalone deployment scenario, the wireless backhaul device is introduced, to backhaul data that the terminal side device transmits through the secondary access device, thereby improving data transmission performance. Therefore, in the non-standalone deployment scenario, how to make the wireless backhaul device access the second network side device is a problem to be resolved.

SUMMARY

In view of the foregoing technical problem, embodiments of this application provide a wireless backhaul communication processing method and a related device.

A first aspect of this application provides a wireless backhaul communication processing method, including:

after determining a second network side device as a secondary access device of a wireless backhaul device, sending, by a first network side device, first information to the second network side device, where the first information includes at least one of the following indication information: information indicating that the wireless backhaul device performs access, information indicating whether the wireless backhaul device is a non-standalone device or a standalone device, information indicating whether the wireless backhaul device supports a full-duplex mode or a half-duplex mode, information indicating whether the wireless backhaul device supports an in-band backhaul function or an out-of-band backhaul function, and information indicating whether the wireless backhaul device supports a data forwarding function above a packet data convergence protocol PDCP layer or a data forwarding function at and below a PDCP layer.

According to the technical solution provided in the first aspect, after determining the secondary access device of the wireless backhaul device, the first network side device sends capability indication information about the wireless backhaul device to the secondary access device, so that the wireless backhaul device establishes a radio link to the secondary access device.

Optionally, the method further includes: receiving, by the first network side device, configuration information generated by the second network side device, where the configuration information is used to configure the radio link between the wireless backhaul device and the second network side device. In this optional implementation, when learning that the wireless backhaul device needs to access the second network side device, the second network side device configures the radio link for the wireless backhaul device, so that the wireless backhaul device accesses the second network side device.

Optionally, the configuration information includes at least one of a transmission time unit configuration of the radio link and a cell identifier of the wireless backhaul device. In this optional implementation, possible configured content in the configuration information is listed.

Optionally, the method further includes: before the sending, by the first network side device, first information to the second network side device, receiving, by the first network side device, second information sent by the wireless backhaul device, where the second information includes the at least one of the following indication information: information indicating that the wireless backhaul device performs access, information indicating that the wireless backhaul device supports a dual connectivity function, information indicating whether the wireless backhaul device is a non-standalone device or a standalone device, information indicating whether the wireless backhaul device supports the full-duplex mode or the half-duplex mode, information indicating whether the wireless backhaul device supports the in-band backhaul function or the out-of-band backhaul function, and information indicating whether the wireless backhaul device supports the data forwarding function above the packet data convergence protocol PDCP layer or the data forwarding function at and below the PDCP layer. In this possible implementation, the wireless backhaul device sends a capability indication about the wireless backhaul device to the first network side device, so that the first network side device determines the secondary access device for the wireless backhaul device, helping to implement dual connectivity in a non-standalone scenario.

Optionally, the method further includes: receiving, by the first network side device, third information sent by the second network side device, where the third information indicates an association relationship between the second network side device and a cell of the wireless backhaul device, an association relationship between a cell of the second network side device and a cell of the wireless backhaul device, or an association relationship between a cell of the second network side device and the wireless backhaul device. In this optional implementation, the first network side device learns of, from the second network side device, the association relationship that exists when the wireless backhaul device connects to the second network side device, so that the first network side device optimizes system management.

A second aspect of the embodiments of this application provides a wireless backhaul communication processing method, including:

initiating, by a wireless backhaul device, a random access process to a first network side device; and sending, by the wireless backhaul device in the random access process or after the random access process is completed, at least one of the following indication information to the first network side device:

information indicating that the wireless backhaul device performs access, information indicating that the wireless backhaul device supports a dual connectivity function, information indicating whether the wireless backhaul device is a non-standalone device or a standalone device, information indicating whether the wireless backhaul device supports a full-duplex mode or a half-duplex mode, information indicating whether the wireless backhaul device supports an in-band backhaul function or an out-of-band backhaul function, and information indicating whether the wireless backhaul device supports a data forwarding function above a packet data convergence protocol PDCP layer or a data forwarding function at and below a PDCP layer.

According to the technical solution provided in the second aspect, the wireless backhaul device sends a capability indication about the wireless backhaul device to the first network side device, so that the first network side device determines a secondary access device for the wireless backhaul device, helping to implement dual connectivity in a non-standalone scenario.

Optionally, when the wireless backhaul device supports the dual connectivity function, the method further includes: receiving, by the wireless backhaul device, configuration information generated by a second network side device, where the configuration information is used to configure a radio link between the wireless backhaul device and the second network side device. In this optional implementation, the wireless backhaul device may establish the radio link to the second network side device by using the configuration information generated by the second network side device, to access the second network side device.

Optionally, the configuration information includes at least one of a transmission time unit configuration of the radio link and a cell identifier of the wireless backhaul device. In this optional implementation, possible configured content in the configuration information is listed.

Optionally, after accessing the second network side device, the wireless backhaul device notifies the second network side device of an association relationship between the second network side device and a cell of the wireless backhaul device, an association relationship between a cell of the second network side device and a cell of the wireless backhaul device, or an association relationship between a cell of the second network side device and the wireless backhaul device, so that the wireless backhaul device extends signal coverage of the second network side device.

Optionally, the wireless backhaul device notifies the association relationship to the first network side device, so that the first network side device learns that the wireless backhaul device accesses the second network side device to extend signal coverage of the second network side device.

A third aspect of this application provides a wireless backhaul communication processing method, including:

receiving, by a wireless backhaul device, system information sent by a second network side device, where the system information includes at least one of the following indication information: information indicating whether access of the wireless backhaul device is allowed, and information indicating a random access resource used by the wireless backhaul device to access the second network side device; and initiating, by the wireless backhaul device, a random access process to the second network side device based on the indication information.

According to the technical solution provided in the third aspect, the wireless backhaul device may access the second network side device based on the indication in the system information sent by the second network side device.

Optionally, the method further includes: sending, by the wireless backhaul device in the random access process or after the random access process is completed, at least one of the following indication information to the second network side device:

information indicating that the wireless backhaul device performs access, information indicating whether the wireless backhaul device is a non-standalone device or a standalone device, information indicating whether the wireless backhaul device supports a full-duplex mode or a half-duplex mode, information indicating whether the wireless backhaul device supports an in-band backhaul function or an out-of-band backhaul function, and information indicating whether the wireless backhaul device supports a data forwarding function above a packet data convergence protocol PDCP layer or a data forwarding function at and below a PDCP layer.

In this optional implementation, the wireless backhaul device may send the function indication to the second network side device, to help the second network side device learn of basic information about the wireless backhaul device, thereby establishing a radio link.

Optionally, the method further includes: sending, by the wireless backhaul device, a notification to the second network side device, where the notification indicates an association relationship between the second network side device and a cell of the wireless backhaul device, an association relationship between a cell of the second network side device and a cell of the wireless backhaul device, or an association relationship between a cell of the second network side device and the wireless backhaul device. In this optional implementation, the wireless backhaul device notifies the association relationship that exists when the wireless backhaul device accesses the second network side device, helping to implement dual connectivity after the radio link is established.

A fourth aspect of the embodiments of this application provides a wireless backhaul device, including:

sending, by a second network side device, system information, where the system information includes at least one of the following indication information: information indicating whether access of the wireless backhaul device is allowed, and information indicating a random access resource used by the wireless backhaul device to access the second network side device; and performing, by the second network side device, a random access process with the wireless backhaul device based on the indication information.

According to the technical solution provided in the fourth aspect, the second network side device indicates, by using the system information, the random access resource used when the wireless backhaul device accesses the second network side device and that the access of the wireless backhaul device is allowed, so that the wireless backhaul device accesses the second network side device.

Optionally, the method further includes: receiving, by the second network side device in the random access process or after the random access process is completed, at least one of the following indication information that is sent by the wireless backhaul device:

information indicating that the wireless backhaul device performs access, information indicating whether the wireless backhaul device is a non-standalone device or a standalone device, information indicating whether the wireless backhaul device supports a full-duplex mode or a half-duplex mode, information indicating whether the wireless backhaul device supports an in-band backhaul function or an out-of-band backhaul function, and information indicating whether the wireless backhaul device supports a data forwarding function above a packet data convergence protocol PDCP layer or a data forwarding function at and below a PDCP layer. In this optional implementation, the wireless backhaul device sends the capability indication about the wireless backhaul device to the second network side device, so that a radio link is established between the second network side device and the wireless backhaul device, helping to implement dual connectivity in a non-standalone scenario.

Optionally, the method further includes: receiving, by the second network side device in the random access process or after the random access process is completed, a notification sent by the wireless backhaul device, where the notification indicates an association relationship between the second network side device and a cell of the wireless backhaul device, an association relationship between a cell of the second network side device and a cell of the wireless backhaul device, or an association relationship between a cell of the second network side device and the wireless backhaul device. In this optional implementation, the wireless backhaul device notifies the association relationship that exists when the wireless backhaul device accesses the second network side device, helping to implement dual connectivity after the radio link is established.

Optionally, the method further includes: sending, by the second network side device, a notification to a first network side device, where the notification indicates the association relationship between the second network side device and the cell of the wireless backhaul device, the association relationship between the cell of the second network side device and the cell of the wireless backhaul device, or the association relationship between the cell of the second network side device and the wireless backhaul device. In this optional implementation, the second network side device notifies the first network side device of the association relationship that exists when the wireless backhaul device accesses the second network side device, helping to implement dual connectivity.

A fifth aspect of the embodiments of this application provides a network side device. The network side device includes a receiving unit, a processing unit, and a sending unit. The receiving unit is configured to perform a receiving action in any one of the first aspect, the possible implementations of the first aspect, the fourth aspect, and the possible implementations of the fourth aspect. The processing unit is configured to perform a processing action, such as a determining action, in any one of the first aspect, the possible implementations of the first aspect, the fourth aspect, and the possible implementations of the fourth aspect. The sending unit is configured to perform an action, such as a sending action, in any one of the first aspect, the possible implementations of the first aspect, the fourth aspect, and the possible implementations of the fourth aspect. In specific physical implementation, the receiving unit may be a receiving circuit or a receiver, the processing unit may be a processing circuit or a processor, and the sending unit may be a sending circuit or a transmitter. Optionally, the network side device may be an independent network device, or may be a chip or a circuit system in the network side device. The chip or the circuit system includes a plurality of gate circuits to implement functions of the foregoing functional units. The network side device provided in the fifth aspect can implement a beneficial effect achieved in any one of the first aspect, the possible implementations of the first aspect, the fourth aspect, and the possible implementations of the fourth aspect. Details are not described again.

A sixth aspect of the embodiments of this application provides a wireless backhaul device. The wireless backhaul device includes a receiving unit, a processing unit, and a sending unit. The receiving unit is configured to perform a receiving action in any one of the second aspect, the possible implementations of the second aspect, the third aspect, and the possible implementations of the third aspect. The processing unit is configured to perform a processing action, such as a determining action, in any one of the first aspect, the possible implementations of the first aspect, the third aspect, and the possible implementations of the third aspect. The sending unit is configured to perform an action, such as a sending action, in any one of the first aspect, the possible implementations of the first aspect, the third aspect, and the possible implementations of the third aspect. In specific physical implementation, the receiving unit may be a receiving circuit or a receiver, the processing unit may be a processing circuit or a processor, and the sending unit may be a sending circuit or a transmitter. Optionally, the network side device may be an independent network device, or may be a chip or a circuit system in the network side device. The chip or the circuit system includes a plurality of gate circuits to implement functions of the foregoing functional units. The network side device provided in the sixth aspect can implement a beneficial effect achieved in any one of the first aspect, the possible implementations of the first aspect, the third aspect, and the possible implementations of the third aspect. Details are not described again.

A seventh aspect of the embodiments of this application provides a network side device. The network side device includes a sending unit and a receiving unit. The sending unit is configured to perform a sending action in any one of the second aspect and the possible implementations of the second aspect, and the receiving unit is configured to perform a receiving action in any one of the second aspect and the possible implementations of the second aspect. In specific physical implementation, the sending unit may be a sending circuit, and the receiving unit may be a receiving circuit. Optionally, the network side device may be an independent network side device (e.g., a base station), or may be a chip or a circuit system in the network side device. The chip or the circuit system includes a plurality of gate circuits to implement functions of the foregoing functional units. The communication processing apparatus provided in the fourth aspect can implement a beneficial effect achieved in any one of the second aspect and the possible implementations of the second aspect. Details are not described again.

An eighth aspect of the embodiments of this application provides a communication processing apparatus, including a processor and a memory. The memory stores instruction code, and when the code is invoked by the processor, the method according to any one of the first aspect, the second aspect, the third aspect, the fourth aspect, and the possible implementations is implemented. Optionally, the communication processing apparatus provided in the eighth aspect may be a chip system, or a network side device or wireless backhaul device that includes the chip system. The communication processing apparatus provided in the eighth aspect can implement a beneficial effect achieved in any one of the foregoing aspects and the possible implementations. Details are not described again.

A ninth aspect of this application provides a computer storage medium. The computer storage medium stores code, and the code is used to implement the method according to any one of the foregoing aspects and the possible implementations. The computer storage medium provided in the ninth aspect may be included in a chip system, or a network side device or wireless backhaul device that includes the chip system. The computer storage medium provided in the sixth aspect can implement a beneficial effect achieved in any one of the foregoing aspects and the possible implementations. Details are not described again.

DESCRIPTION OF EMBODIMENTS

Figure 1:
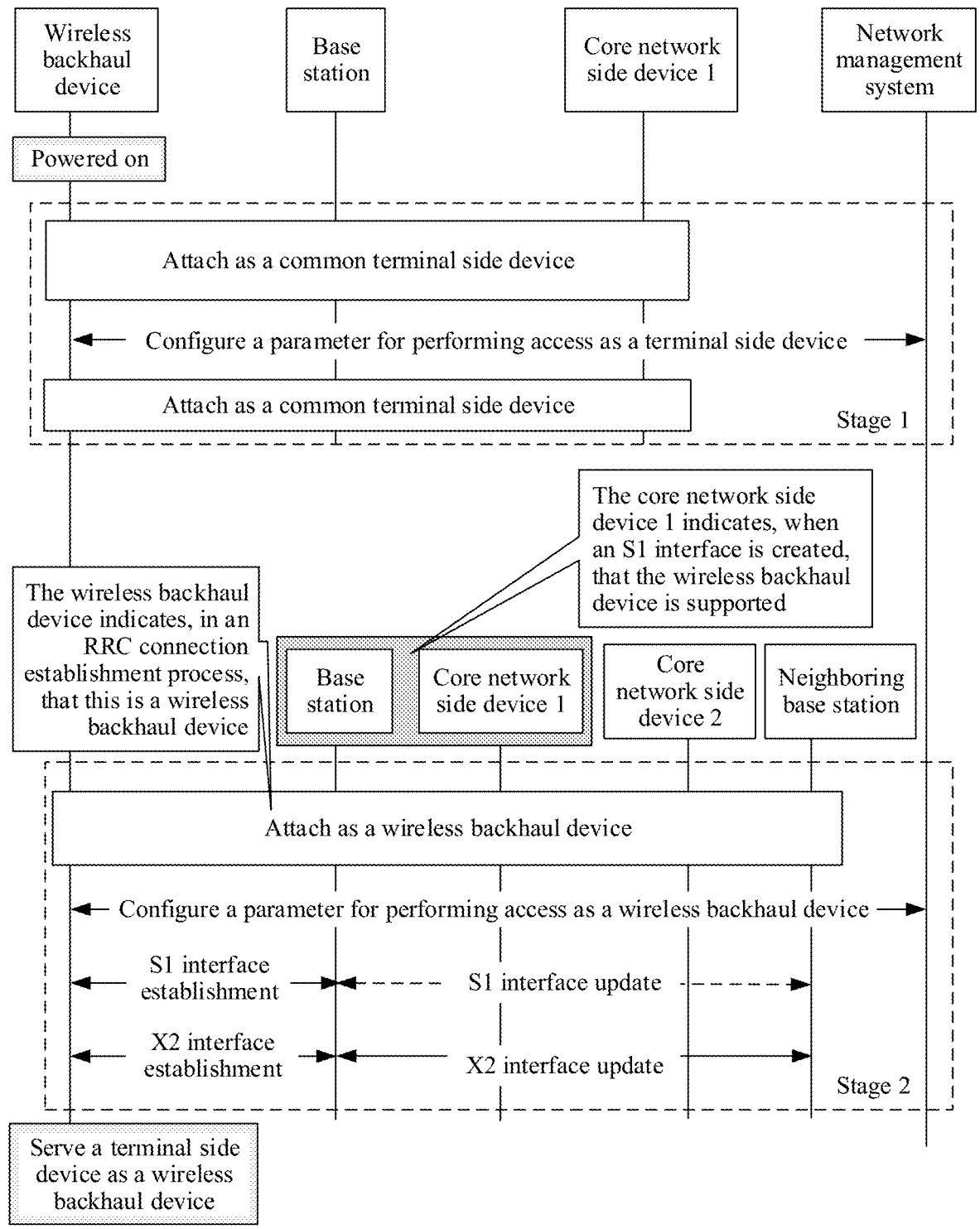
FIG. 1 is a schematic interaction diagram of accessing a wireless communications system by a wireless backhaul device according to an embodiment of this application.

In embodiments of this application, a wireless communications system includes a network side device and a wireless backhaul device, and optionally, further includes a terminal side device and core network devices (including a core network control plane device and a core network user plane device). The network side device may be various transmission reception points (TRP) such as a base station or a wireless local area network access point, and provides an access service in a licensed spectrum or an access service in an unlicensed spectrum. The network side device is connected to the core network device in a wired or wireless manner. The wireless backhaul device may be a base station or a wireless local area network access point, and is configured to provide data backhaul. The network side device may directly provide a service for the terminal side device, or may provide a service for the terminal side device through the wireless backhaul device. A link between the network side device and the wireless backhaul device is a radio link, and a link between the wireless backhaul device and the terminal side device is an access link. In an LTE system, the wireless backhaul device is also referred to as a relay. In an NR system, the wireless backhaul device is also referred to as an integrated access and backhaul (IAB) node. In the LTE system, a base station is an evolved NodeB (eNB). In an NR system, a base station is a next generation Node B (gNB). The network side device may communicate with the wireless backhaul device or the terminal side device based on protocol layers. The protocol layers include but are not limited to a physical (PHY) layer, a media access control (MAC) layer, a radio link control (RLC) layer, a packet data convergence protocol (PDCP) layer, a radio resource control (RRC) layer, and the like. Optionally, a non-access stratum (NAS) layer is further included between the wireless backhaul device or the terminal side device and the core network device.

The network side device may be used as an independent device, or may be divided into different devices based on the protocol layers. For example, after the network side device is divided based on the protocol layers, the network side device may include one control unit (CU) and at least one distributed unit (DU). The CU is configured to implement functions of the network side device at the PDCP layer, the RRC layer, and a protocol layer above the PDCP layer or the RRC layer. The DU is configured to implement functions of the network side device at the RLC layer, the MAC layer, and the PHY layer. A person skilled in the art may understand that, in the following implementations, a function of the network side device at the PDCP layer, the RRC layer, or a protocol layer above the PDCP layer or the RRC layer may be performed by the CU, and a function of the network side device at the RLC layer, the MAC layer, or the PHY layer is performed by the at least one DU.

In the embodiments of this application, from a perspective of physical implementation, the wireless backhaul device may be a base station or a wireless local area network access point, or may be a chip or a circuit system in the base station or in the wireless local area network access point. The network side device may be a base station or a wireless local area network access point, or may be a chip or a circuit system in the base station or in the wireless local area network access point. The network side device includes a non-standalone network side device and a standalone network side device.

The wireless backhaul device may be connected to the non-standalone network side device and the standalone network side device simultaneously, thereby implementing dual connectivity. However, because the non-standalone network side device indicates, by using a system message, to forbid a terminal side device to camp on the non-standalone network side device, the wireless backhaul device cannot camp on the non-standalone network side device either, and consequently, the wireless backhaul device cannot access a network and therefore cannot provide data backhaul for the terminal side device.

Figure 2A:
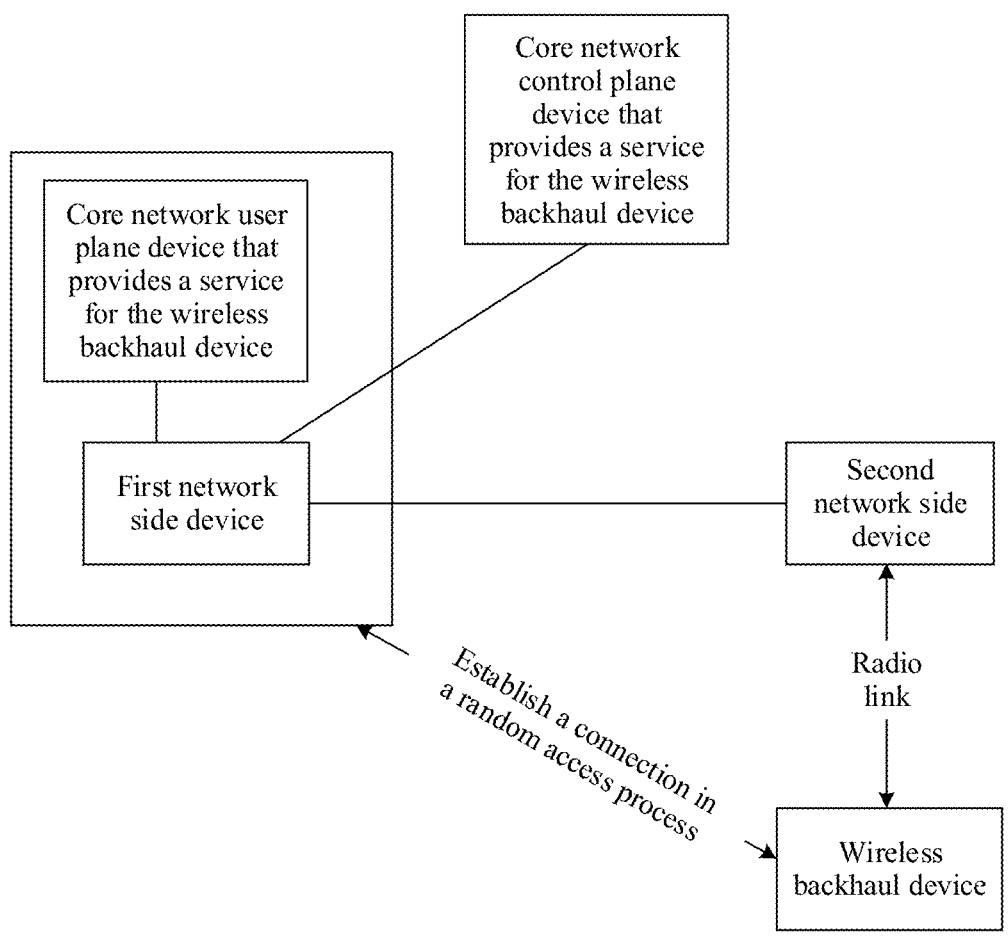
FIG. 2A is a schematic diagram of a system architecture according to a first embodiment of this application.
Figure 2B:
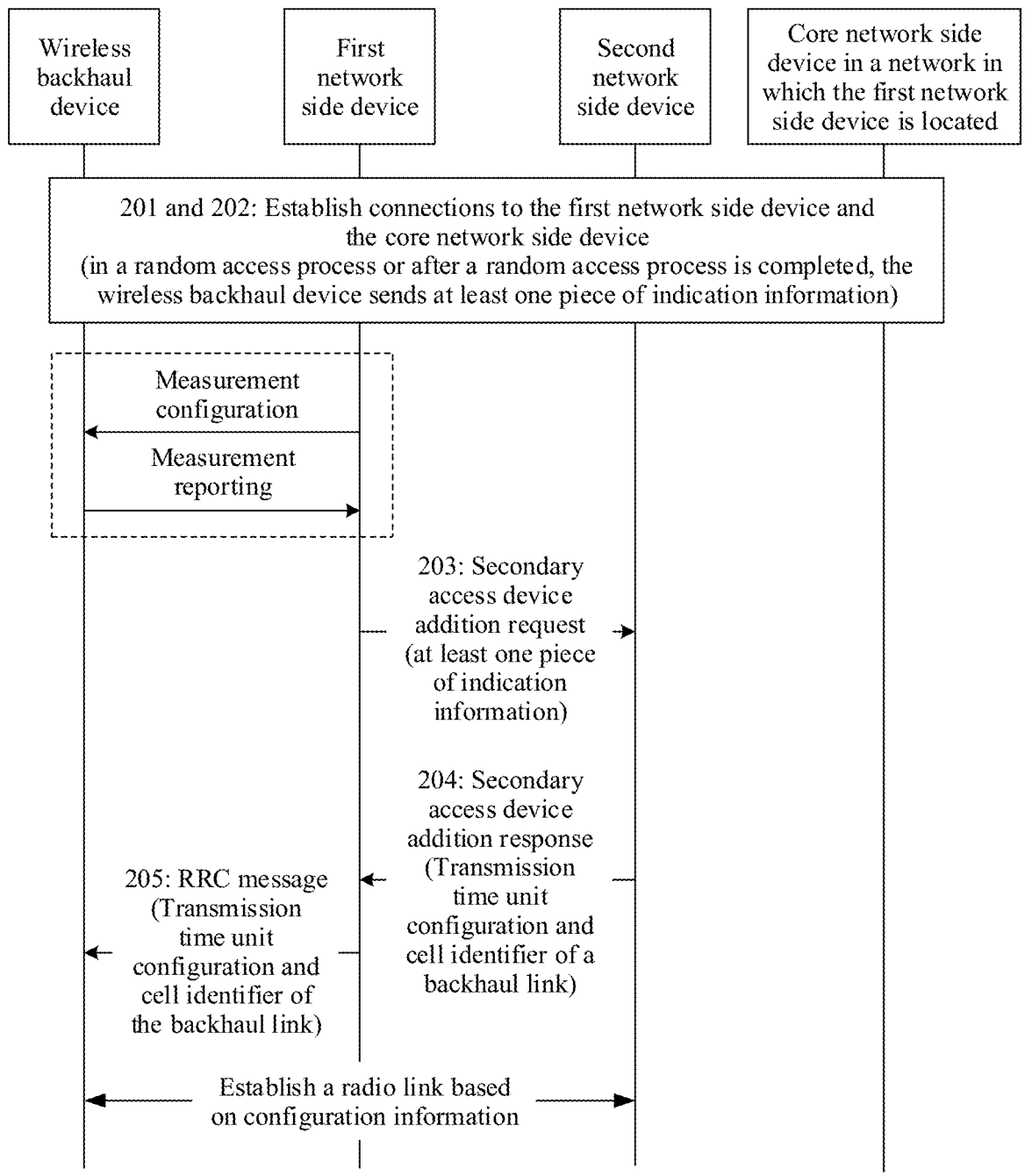
FIG. 2B is a schematic diagram of system interaction that is based on the system architecture shown in FIG. 2A according to a first embodiment of this application.

A first embodiment of this application provides a wireless backhaul communication processing method. A schematic diagram of a system architecture shown in FIG. 2A and a schematic diagram of system interaction shown in FIG. 2B include the following content. In this embodiment, a wireless backhaul device establishes a radio link to a second network side device, and connects, through the second network side device and a first network side device, to a core network device of a network in which the first network side device is located.

201: The wireless backhaul device initiates a random access process to the first network side device.

202: The wireless backhaul device sends, in the random access process or after the random access process is completed, at least one of the following indication information to the first network side device:

Information indicating that the wireless backhaul device performs access, information indicating that the wireless backhaul device supports a dual connectivity function, information indicating whether the wireless backhaul device is a non-standalone device or a standalone device, information indicating whether the wireless backhaul device supports a full-duplex mode or a half-duplex mode, information indicating whether the wireless backhaul device supports an in-band backhaul function or an out-of-band backhaul function, and information indicating whether the wireless backhaul device supports a data forwarding function above a packet data convergence protocol PDCP layer or a data forwarding function at and below a PDCP layer.

The standalone device is a device that can exist independently, can be accessed by a terminal side device, and can provide the terminal side device with control plane end-to-end connectivity and user plane end-to-end connectivity. The non-standalone device is a device that cannot exist independently and can provide, only together with a standalone device, a service for a terminal device. The non-standalone device does not allow the terminal side device in an idle state to camp on the non-standalone device, and does not allow the terminal device in the idle state to initiate random access in a cell of the non-standalone device.

In the full-duplex mode, the wireless backhaul device supports simultaneous sending and receiving operations. In the half-duplex mode, the wireless backhaul device does not support simultaneous sending and receiving operations, that is, at a same moment, the wireless backhaul device either performs a receiving operation or performs a sending operation. Specifically, the wireless backhaul device may use indication information of a Boolean type to indicate whether the full-duplex mode is supported. When the Boolean type is Yes (i.e., True), the full-duplex mode is supported; or when the Boolean type is No (i.e., False), the half-duplex mode is supported by default. Alternatively, the wireless backhaul device uses indication information of an enumeration type {full duplex, half duplex} and selects one therefrom to indicate whether the full-duplex mode or the half-duplex mode is currently supported.

When the in-band backhaul function is supported, a radio link between the wireless backhaul device and an accessed network side device and a radio link used to access the terminal side device work on a same frequency or adjacent frequencies (e.g., where a frequency difference between the adjacent frequencies is less than a threshold). When the out-of-band backhaul function is supported, a radio link between the wireless backhaul device and an accessed network side device and a radio link used to access the terminal side device work at different frequencies or frequencies whose frequency difference is greater than a threshold. Specifically, the wireless backhaul device may use indication information of a Boolean type to indicate whether the in-band backhaul function is supported. When the Boolean type is Yes (i.e., True), the in-band backhaul function is supported; or when the Boolean type is No (i.e., False), the out-of-band backhaul function is supported. Alternatively, the wireless backhaul device uses indication information of an enumeration type {in-band backhaul, out-of-band backhaul} and selects one therefrom to indicate whether the in-band backhaul function or the out-of-band backhaul function is currently supported.

The data forwarding function above the PDCP layer refers to data forwarding based on a PDCP service data unit (SDU) or an IP packet, and a wireless backhaul device supporting the data forwarding function above the PDCP layer is an L3 wireless backhaul apparatus specified in 3GPP standards. The data forwarding function at and below the PDCP layer refers to data forwarding based on a PDCP protocol data unit (PDU), an RLC PDU, or the like, and a wireless backhaul device supporting the data forwarding function at and below the PDCP layer is an L2 wireless backhaul device specified in the 3GPP standards. Specifically, the wireless backhaul device may use indication information of a Boolean type to indicate whether the wireless backhaul device is the L2 wireless backhaul device. When the Boolean type is Yes (i.e., True), the wireless backhaul device is the L2 wireless backhaul device; or when the Boolean type is No (i.e., False), the wireless backhaul device is the L3 wireless backhaul device. Alternatively, the wireless backhaul device uses indication information of an enumeration type {L2, L3} and selects one therefrom to indicate whether the wireless backhaul device is the L2 wireless backhaul device or the L3 wireless backhaul device.

In 201, the wireless backhaul device initiates the random access process to the first network side device, and the wireless backhaul device establishes an RRC connection to the first network side device through the random access process. Further, the wireless backhaul device establishes a control plane connection to the first network side device and a core network control plane device of the network in which the first network side device is located, and the wireless backhaul device establishes a user plane connection to the first network side device and a core network user plane device in the network in which the first network side device is located. The core network user plane device that provides a service for the wireless backhaul device may be disposed inside the first network side device, or may be disposed outside the first network side device.

In 202, the wireless backhaul device sends the indication information to the first network side device, so that the first network side device may learn that the wireless backhaul device accesses the first network side device, and may learn of capability information of the wireless backhaul device, for example, whether the dual connectivity function is supported, whether the wireless backhaul device is a standalone device or a non-standalone device, whether the full-duplex mode or the half-duplex mode is supported, whether the in-band backhaul function or the out-of-band backhaul function is supported, and whether the data forwarding function above the packet data convergence protocol PDCP layer or the data forwarding function at and below the PDCP layer is supported. Optionally, when the wireless backhaul device supports an LTE-NR dual connectivity function, the first network side device is of the LTE technology, the second network side device is of the NR technology, a core network device connected to the first network device is an LTE core network device, and the second network side device is connected to the LTE core network device through the first network side device. In a networking manner in the first embodiment, the second network side device is not connected to an NR core network device. Whether the dual connectivity function is supported may be: whether the LTE-NR dual connectivity function is supported, whether an NR-NR dual connectivity function is supported, whether an LTE-LTE dual connectivity function is supported, and the like.

Figure 2C:
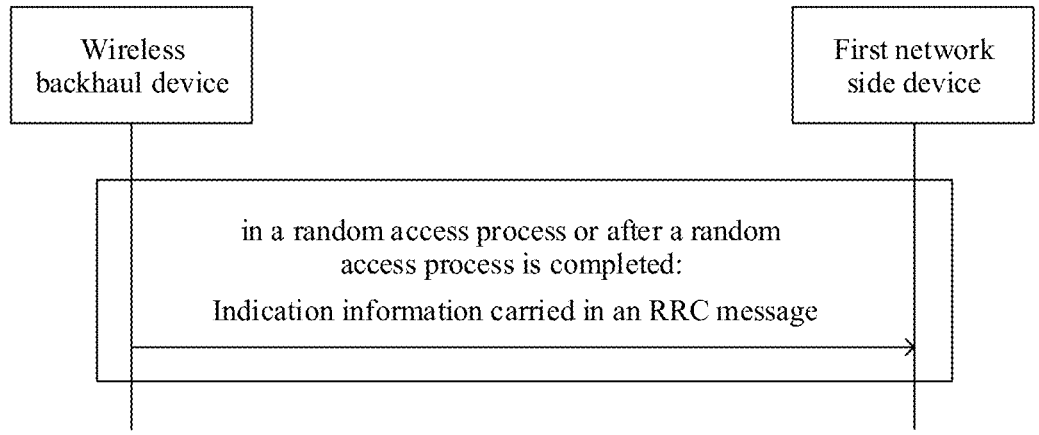
FIG. 2C shows a possible implementation of sending indication information by a wireless backhaul device according to a first embodiment of this application.

Optionally, as shown in FIG. 2C, the at least one indication information may be carried in an RRC message and sent by the wireless backhaul device to the first network side device, and the first network side device may parse the RRC message to obtain the at least one indication information.

Figure 2D:
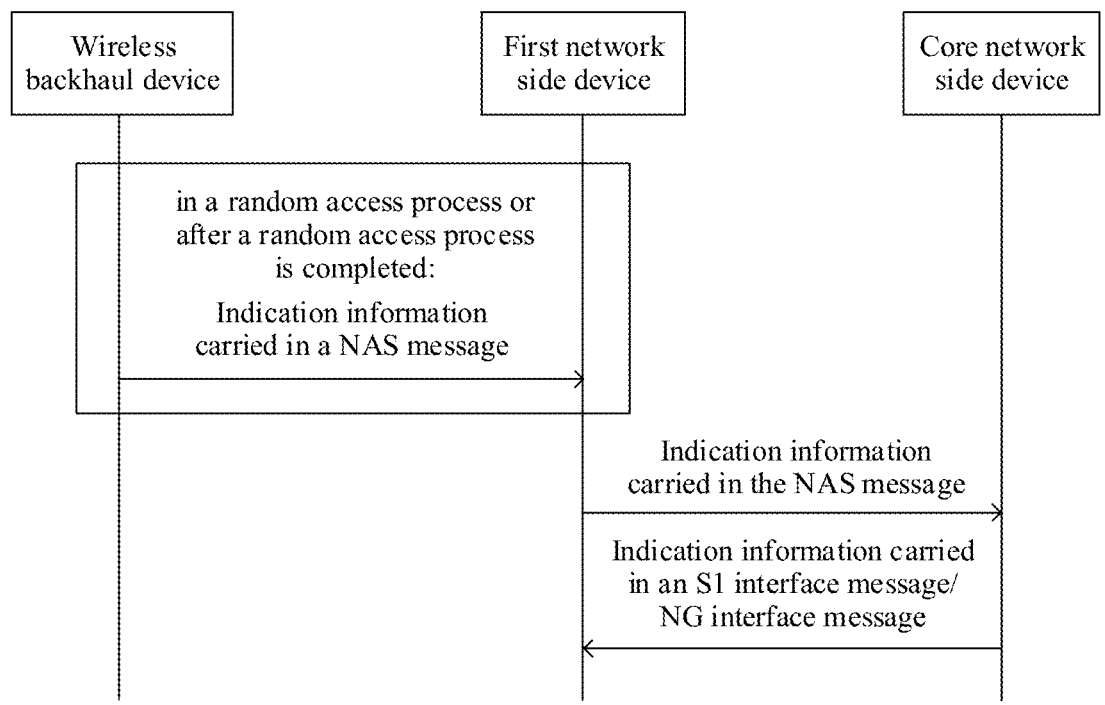
FIG. 2D shows another possible implementation of sending indication information by a wireless backhaul device according to a first embodiment of this application.

Optionally, as shown in FIG. 2D, the at least one indication information may alternatively be carried in a non-access stratum (NAS) message. Because the first network side device does not have a NAS, the first network side device transparently transmits the NAS message to the core network device in the network in which the first network side device is located. After obtaining the indication information by parsing the NAS message, the core network device sends the indication information (e.g., included in an S1 interface message or an NG interface message between the first network device and the core network device) to the first network side device, where an NG interface is an interface between a network side device and a core network device in an NR system.

203: The first network side device determines the second network side device as a secondary access device that provides a dual connectivity service for the wireless backhaul device, and sends at least one of the following indication information to the second network side device:

information indicating that the wireless backhaul device performs access, information indicating whether the wireless backhaul device is a non-standalone device or a standalone device, information indicating whether the wireless backhaul device supports the full-duplex mode or the half-duplex mode, information indicating whether the wireless backhaul device supports the in-band backhaul function or the out-of-band backhaul function, and information indicating whether the wireless backhaul device supports the data forwarding function above the packet data convergence protocol PDCP layer or the data forwarding function at and below the PDCP layer.

Optionally, the at least one indication information may be carried in a secondary access device addition request message, for example, an SgNB addition request, so that the second network side device learns that the second network side device serves as the secondary access device of the wireless backhaul device.

Optionally, the first network side device is a primary access device, and the second network side device is the secondary access device. Correspondingly, a cell of the first network side device belongs to a primary cell group, and a cell of the second network side device belongs to a secondary cell group. The primary cell group includes one primary cell and at least one secondary cell, and the secondary cell group includes a primary cell and at least one secondary cell that are in the same secondary cell group.

Optionally, the first network side device is a standalone network side device, and the second network side device is a non-standalone network side device.

Optionally, after the wireless backhaul device establishes the connection to the first network side device through the random access process, the first network side device may send a measurement configuration to the wireless backhaul device, where the measurement configuration indicates a to-be-measured frequency of a cell of at least one network side device. The wireless backhaul device performs measurement based on the measurement configuration, and reports, to the first network side device, a measurement result for the cell of the at least one network side device. The first network side device selects, based on the measurement result, one network side device as the second network side device to be accessed by the wireless backhaul device. The second network side device and the first network side device may have a same network technology, or may have different network technologies. The second network side device and the first network side device adopt a same network technology, for example, the LTE technology or the NR technology. Alternatively, the second network side device and the first network side device adopt different network technologies, for example, the second network side device adopts the NR technology, and the first network side device adopts the LTE technology. An eNB serving as a primary access device may be represented as a master eNB (MeNB), and a gNB serving as a secondary access device may be represented as a secondary gNB (SgNB).

204: The second network side device sends, to the first network side device, configuration information that is generated by the second network side device and that is used to configure a radio link between the wireless backhaul device and the second network side device.

Optionally, the configuration information may be carried in a secondary access device addition response message, for example, SgNB Addition Request Acknowledge, so that the first network side device learns that the second network side device agrees to the secondary access addition request.

Optionally, the configuration information includes one or a combination of the following: a transmission time unit configuration of the radio link, and a cell identifier of the wireless backhaul device. The transmission time unit of the radio link is specifically a time that can be used for data transmission on the radio link, and may be in a unit of millisecond, time domain symbol, slot, or the like.

Optionally, the second network side device further indicates, to the first network side device, an association relationship between the second network side device and a cell of the wireless backhaul device, an association relationship between a cell of the second network side device and a cell of the wireless backhaul device, or an association relationship between a cell of the second network side device and the wireless backhaul device. The association relationship may be embodied as the cell identifier of the wireless backhaul device. The cell of the wireless backhaul device serves as a cell of the second network side device, to be specific, the cell identifier of the wireless backhaul device and a cell identifier of the second network side device include a same network side device identifier (e.g., a base station identifier). Therefore, after receiving the cell identifier of the wireless backhaul device sent by the second network side device, the first network side device may learn, based on the network side device (e.g., a base station) identifier included in the cell identifier of the wireless backhaul device, that the cell of the wireless backhaul device is a cell of the second network side device.

205: The first network side device sends the configuration information to the wireless backhaul device.

Optionally, the configuration information may be carried in an RRC message (e.g., an RRC connection reconfiguration) and sent to the wireless backhaul device.

Optionally, if the configuration information does not include the cell identifier of the wireless backhaul device, the wireless backhaul device may notify a network management system that the wireless backhaul device provides a wireless backhaul service for the second network side device, so that the network management system (e.g., an OAM system) allocates the cell identifier to the wireless backhaul device. That is, the wireless backhaul device obtains the allocated cell identifier from the network management system. The wireless backhaul device may notify the obtained cell identifier to both the first network side device and the second network side device. Alternatively, the wireless backhaul device notifies the obtained cell identifier to the first network side device, and the first network side device further notifies the cell identifier to the second network side device. Alternatively, the wireless backhaul device notifies the obtained cell identifier to the second network side device, and the second network side device further notifies the cell identifier to the first network side device.

To notify the obtained cell identifier to the second network side device, the wireless backhaul device may notify, after accessing the second network side device, the second network side device in a process of triggering establishment of an X2 interface with the second network side device by the wireless backhaul device. That the second network side device notifies the first network side device of the cell identifier of the wireless backhaul device may be implemented through triggering, by the second network side device, a procedure of updating base station configuration by the first network side device.

206: The wireless backhaul device establishes the radio link to the second network side device based on the configuration information.

According to the technical solution provided in the first embodiment of this application, the wireless backhaul device may access the first network side device, and complete authentication and authorization at the core network device in the network in which the first network side device is located. When learning that the wireless backhaul device supports the dual connectivity function (or supports wireless backhaul functions of different access technologies), the first network side device configures the second network side device as the secondary access device for the wireless backhaul device, to implement dual connectivity of the wireless backhaul device.

Figure 3A:
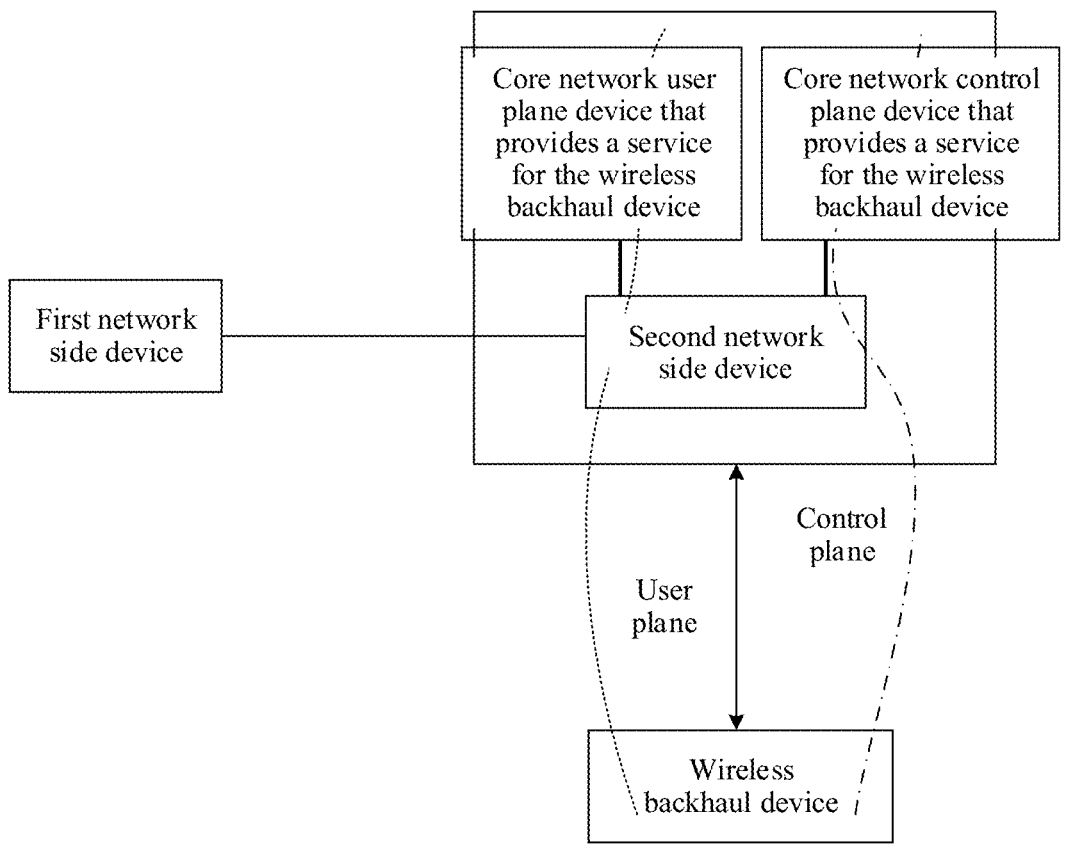
FIG. 3A is a schematic diagram of a system architecture according to a second embodiment of this application.
Figure 3B:
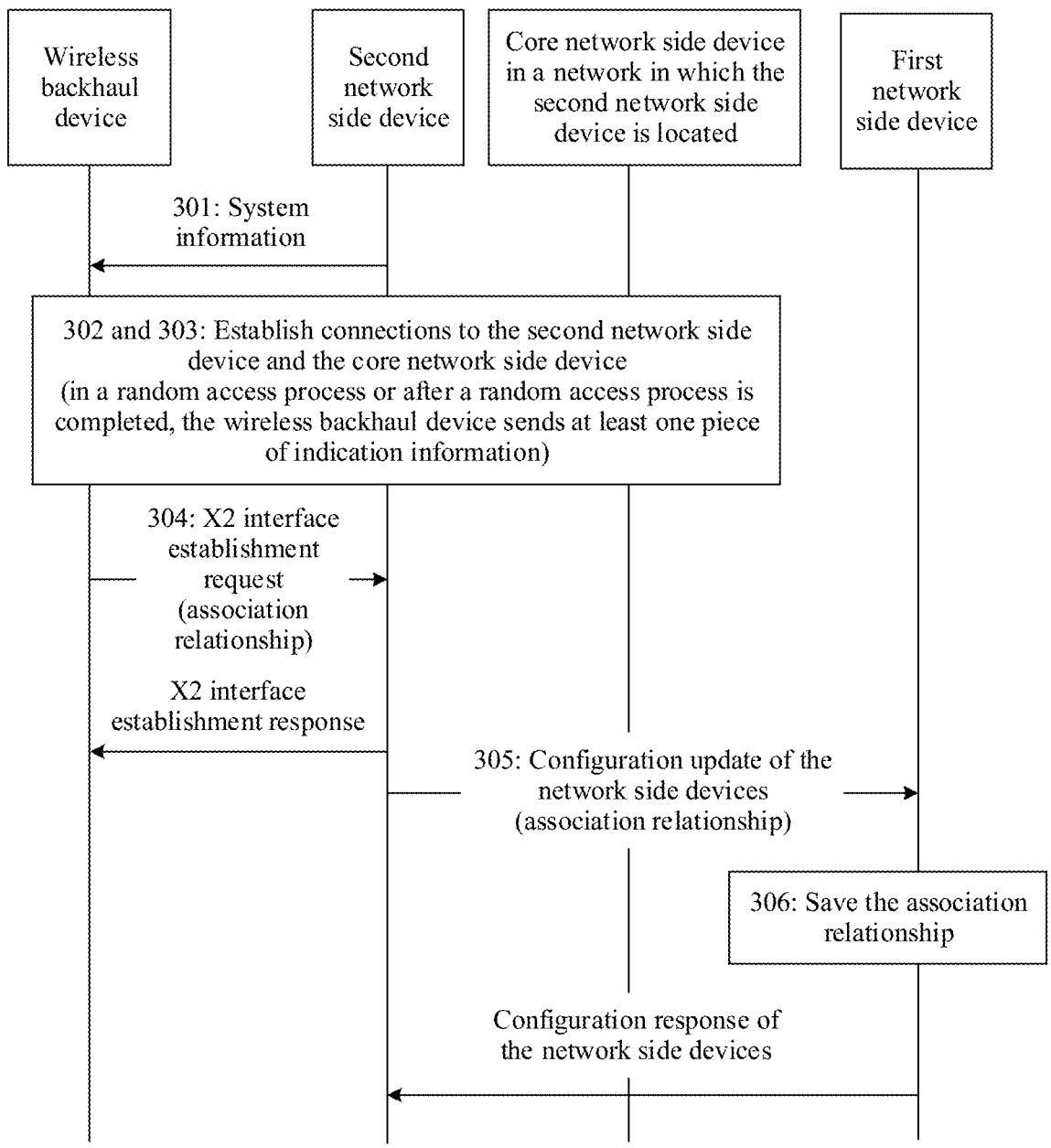
FIG. 3B is a schematic diagram of system interaction that is based on the system architecture shown in FIG. 3A according to a second embodiment of this application.

A second embodiment of this application provides a wireless backhaul communication processing method. A schematic diagram of a system architecture shown in FIG. 3A and a schematic diagram of system interaction shown in FIG. 3B include the following content. In this embodiment, a wireless backhaul device establishes a radio link to a second network side device, and connects, through the second network side device, to a core network device of a network in which the second network side device is located.

301: The second network side device sends system information, where the system information includes at least one of the following indication information: information indicating whether access of the wireless backhaul device is allowed, and information indicating a random access resource used by the wireless backhaul device to access the second network side device.

In 301, the indication information in the system information indicates that only access of a wireless backhaul device is allowed. Therefore, a non-wireless backhaul device, for example, all terminal side devices according to Release 15 and earlier versions of the 3GPP standard specification, cannot access the second network side device.

Optionally, the system information is carried in a master information block (MIB), or may be carried in a system information block (SIB), for example, a SIB 1.

302: The wireless backhaul device receives the system information, and initiates a random access process based on the indication information.

303: The wireless backhaul device sends, in the random access process or after the random access process is completed, at least one of the following indication information to the second network side device:

information indicating that the wireless backhaul device performs access, information indicating whether the wireless backhaul device is a non-standalone device or a standalone device, information indicating whether the wireless backhaul device supports a full-duplex mode or a half-duplex mode, information indicating whether the wireless backhaul device supports an in-band backhaul function or an out-of-band backhaul function, and information indicating whether the wireless backhaul device supports a data forwarding function above a packet data convergence protocol PDCP layer or a data forwarding function at and below a PDCP layer.

Optionally, the method further includes:

304: The wireless backhaul device sends a notification to the second network side device, where the notification indicates an association relationship between the second network side device and a cell of the wireless backhaul device, an association relationship between a cell of the second network side device and a cell of the wireless backhaul device, or an association relationship between a cell of the second network side device and the wireless backhaul device. The association relationship may be embodied as a cell identifier of the wireless backhaul device. A cell of the wireless backhaul device serves as a cell of the second network side device, to be specific, the cell identifier of the wireless backhaul device and a cell identifier of the second network side device include a same network side device identifier. Therefore, after receiving the cell identifier of the wireless backhaul device sent by the wireless backhaul device, the second network side device may learn, based on the network side device identifier included in the cell identifier of the wireless backhaul device, that the cell of the wireless backhaul device is a cell of the second network side device.

To notify the obtained cell identifier to the second network side device, the wireless backhaul device may notify, after accessing the second network side device, the second network side device in a process of triggering establishment of an X2 interface with the second network side device by the wireless backhaul device.

305: The second network side device notifies a first network side device of the association relationship in the notification.

Optionally, the second network side device notifies the association relationship, in a network side configuration update sent to the first network side device. The association relationship may be embodied as the cell identifier of the wireless backhaul device. For example, that the second network side device notifies the first network side device of the cell identifier of the wireless backhaul device may be implemented through triggering, by the second network side device, a procedure of updating network side configuration by the first network side device.

306: The first network side device stores the association relationship in the received notification.

Optionally, after storing the association relationship, the first network side device may send a configuration response of the network side devices to the second network side device.

In this embodiment, a core network device that provides a service for the wireless backhaul device is the core network device in the network in which the second network side device is located. A user plane device of the core network may be disposed inside the second network side device, or both a user plane device and a control plane device of the core network are disposed inside the second network side device.

According to the technical solution provided in the second embodiment of this application, the wireless backhaul device may connect, directly but not through the first network side device, to the second network side device, thereby establishing the radio link.

Figure 4A:
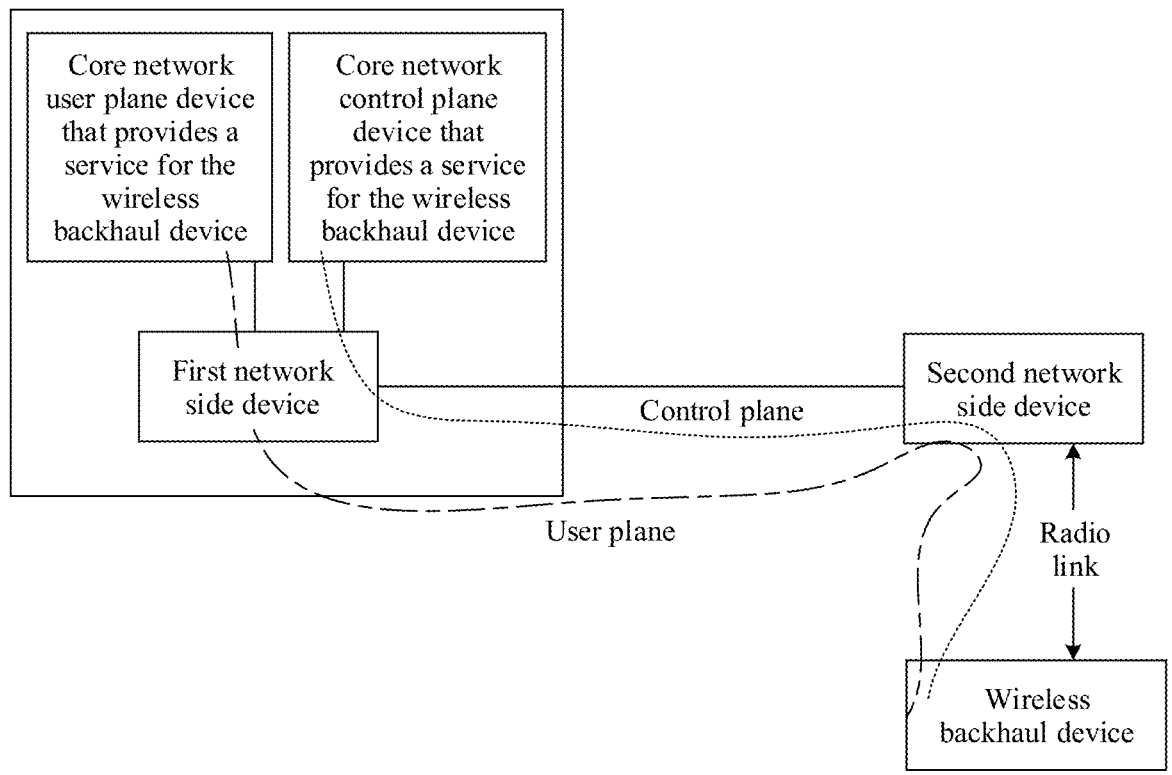
FIG. 4A is a schematic diagram of a system architecture according to a third embodiment of this application.
Figure 4B:
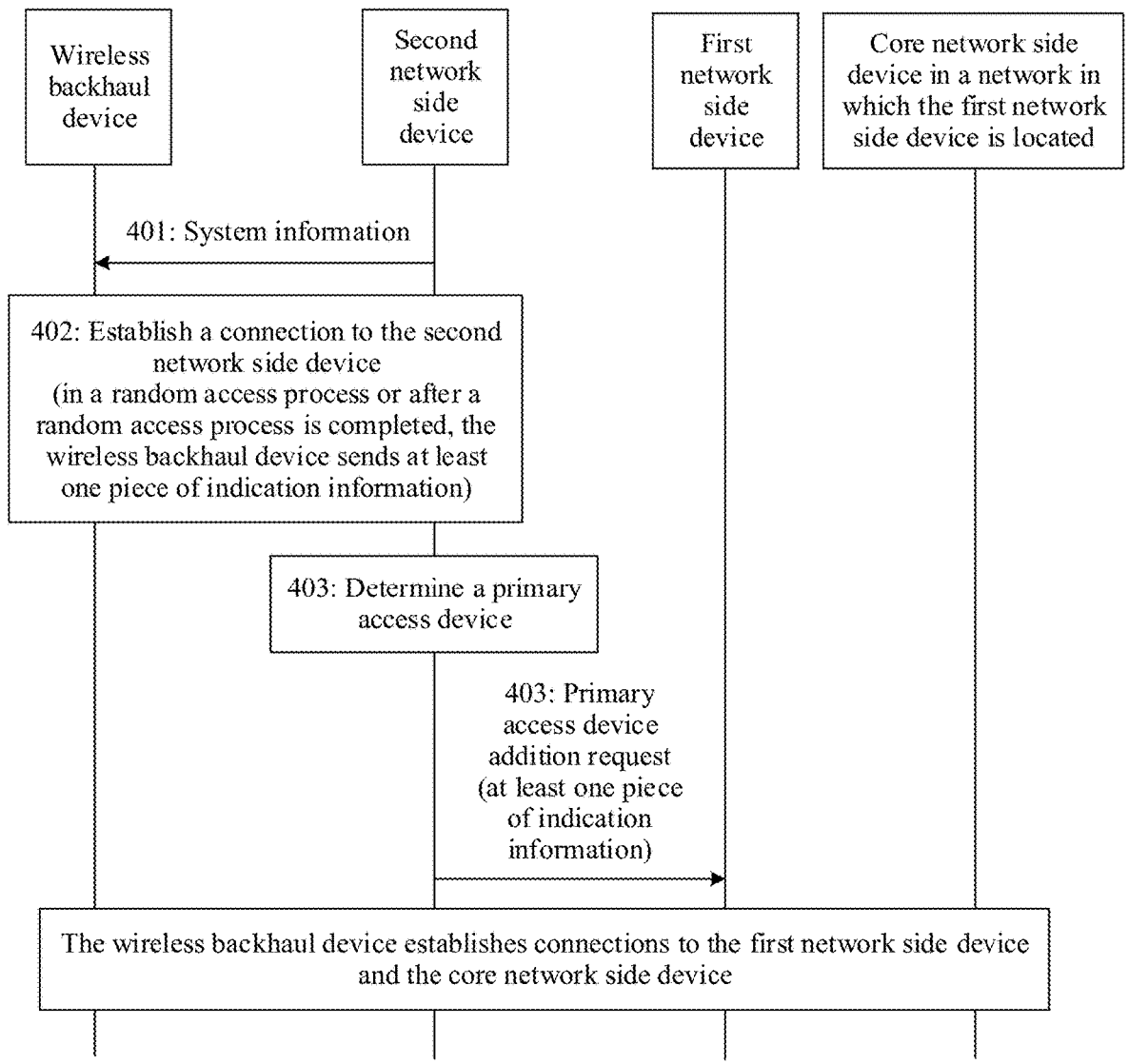
FIG. 4B is a schematic diagram of system interaction that is based on the system architecture shown in FIG. 4A according to a third embodiment of this application.

A third embodiment of this application provides a wireless backhaul communication processing method. A schematic diagram of a system architecture shown in FIG. 4A and a schematic diagram of system interaction shown in FIG. 4B include the following content. In this embodiment, a wireless backhaul device establishes a radio link to a second network side device, and connects, through the second network side device and a first network side device, to a core network device of a network in which the first network side device is located. Optionally, the first network side device is a standalone network side device, and the second network side device is a non-standalone network side device. Optionally, the first network side device is of the LTE technology, the second network side device is of the NR technology, and the second network side device is connected to an LTE core network device through the first network side device. In a networking manner in this embodiment, the second network side device is not connected to an NR core network device.

401: The second network side device sends system information, where the system information includes at least one of the following indication information: information indicating whether access of the wireless backhaul device is allowed, and information indicating a random access resource used by the wireless backhaul device to access the second network side device.

In 401, the indication information in the system information indicates that only access of a wireless backhaul device is allowed. Therefore, a non-wireless backhaul device, for example, all terminal side devices according to Release 15 and earlier versions of the 3GPP standard specification, cannot access the second network side device.

Optionally, the system information is carried in a master information block, or may be carried in a system information block, for example, a SIB 1.

402: The wireless backhaul device initiates a random access process to the second network side device based on the system information, and sends, in the random access process or after the random access process is completed, at least one of the following indication information to the second network side device:

information indicating that the wireless backhaul device performs access, information indicating whether the wireless backhaul device is a non-standalone device, information indicating that the wireless backhaul device supports a dual-connectivity wireless backhaul function, information indicating whether the wireless backhaul device supports a full-duplex mode or a half-duplex mode, information indicating whether the wireless backhaul device supports an in-band backhaul function or an out-of-band backhaul function, and information indicating whether the wireless backhaul device supports a data forwarding function above a packet data convergence protocol PDCP layer or a data forwarding function at and below a PDCP layer.

403: The second network side device selects the first network side device for the wireless backhaul device, and sends the at least one indication information to the first network side device.

Figure 4C:
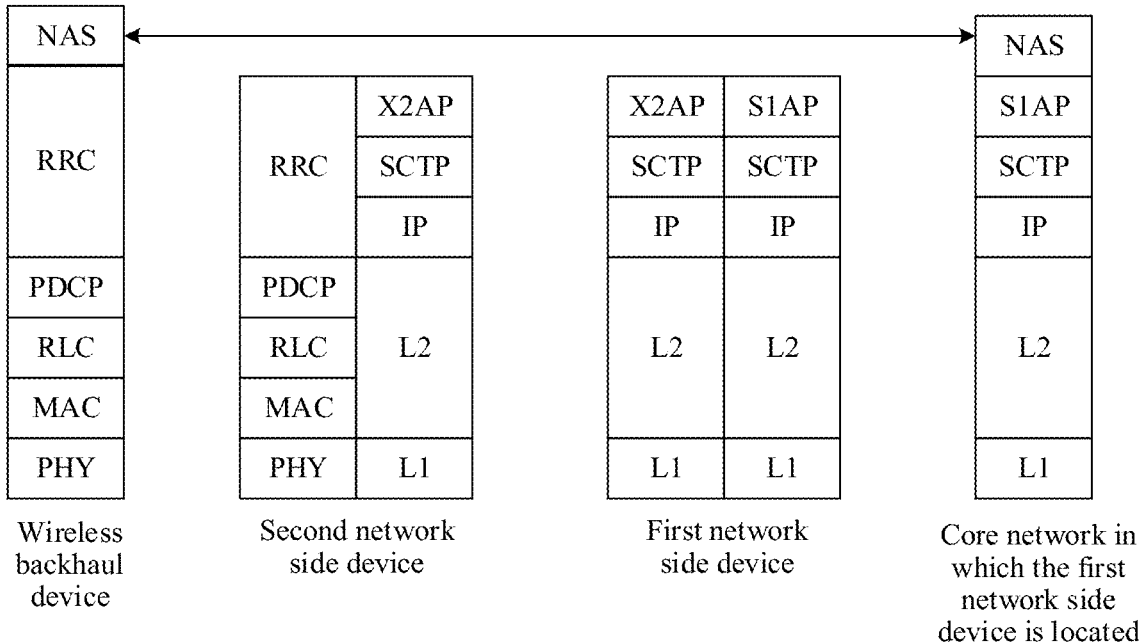
FIG. 4C is a schematic architectural diagram of a protocol stack that is based on FIG. 4A according to a third embodiment of this application.

In 403, the first network side device selected by the second network side device for the wireless backhaul device is a network side device that allows access of the wireless backhaul device. For example, a core network user plane device that provides a service for the wireless backhaul device is disposed inside the first network side device. The first network side device selects, based on the indication information, the core network device that provides a service for the wireless backhaul device, where the core network device is a core network device in the network in which the first network side device is located. In a possible implementation, as shown in a schematic architectural diagram of a protocol stack in FIG. 4C, after receiving a random access request sent by the wireless backhaul device, the second network side device may encapsulate a NAS message of the wireless backhaul device into a first interface message (e.g., an X2 interface (X2AP) message) to be sent to the first network side device, and send the first interface message to the first network side device. The first network side device extracts the NAS message from the first interface message; generates, based on the first interface message, a second interface message (e.g., an S1 interface (S1AP) message) between the first network side device and the core network device in the network in which the first network side device is located; re-encapsulates the NAS message into the second interface message; and sends the second interface message to the core network device. In this way, the core network device obtains the NAS message of the wireless backhaul device by parsing the second interface message, thereby implementing a connection between the wireless backhaul device and the core network device. SCTP is an abbreviation for a stream control transmission protocol layer, IP is an abbreviation for an internet protocol (IP) layer, L1 layer is a physical layer, and L2 layer is a data link layer. For example, the L1 layer is a physical layer defined by an open system interconnection (OSI) reference model, and the L2 layer is an OSI-defined data link layer (DLL).

Figure 4D:
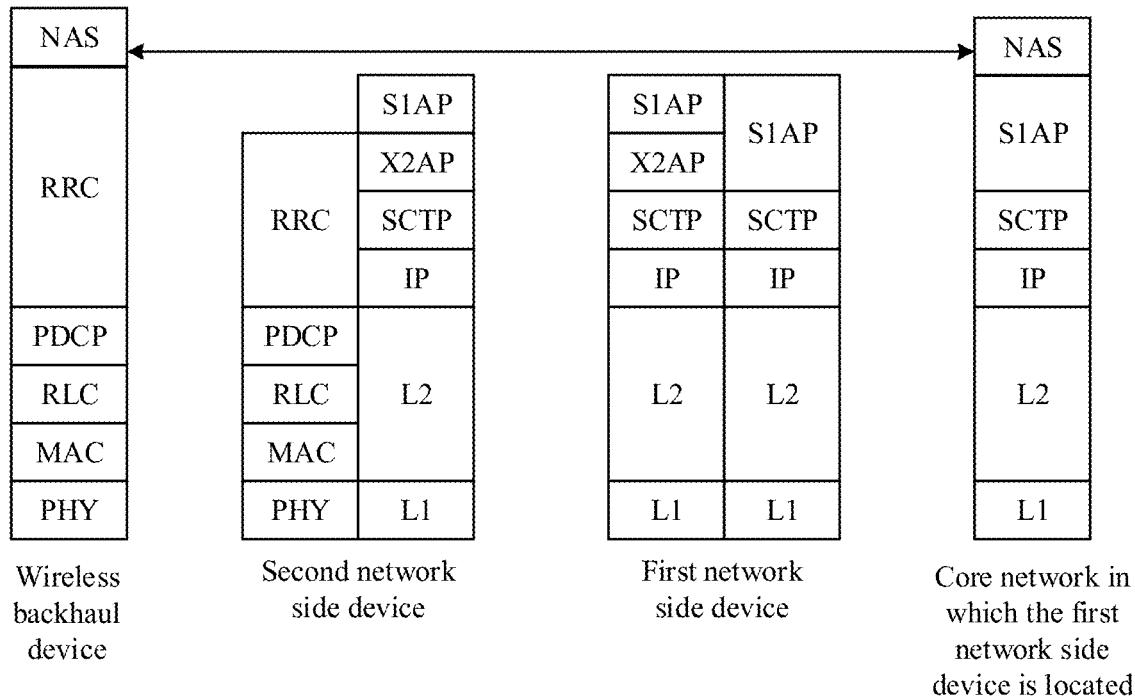
FIG. 4D is a schematic architectural diagram of another protocol stack that is based on FIG. 4A according to a third embodiment of this application.

In another possible implementation, as shown in a schematic architectural diagram of a protocol stack in FIG. 4D, after receiving a random access request sent by the wireless backhaul device, the second network side device may generate, based on an RRC message in which a NAS message of the wireless backhaul device is encapsulated, an S1 interface message between the first network side device and the core network device in the network in which the first network side device is located; and send, to the first network side device, an X2 interface message that is to be sent to the first network side device and that includes the S1 interface message in which the NAS message is encapsulated. After receiving the X2 interface message, the first network side device extracts the S1 interface message from the X2 interface message, and forwards the S1 interface message to the core network device in the network in which the first network side device is located. In this way, the core network device obtains the NAS message of the wireless backhaul device by parsing the interface message, thereby implementing a connection between the wireless backhaul device and the core network device.

In this embodiment, the second network device is a non-standalone network device, and the second network side device does not connect to a core network device in a network in which the second network side device is located.

According to the technical solution provided in the third embodiment of this application, the second network side device (particularly, a non-standalone network side device) may serve as an access device of the wireless backhaul device, and connects, through the first network side device, to the core network device in the network in which the first network side device is located, thereby implementing a network access process of the wireless backhaul device.

Figure 5A:
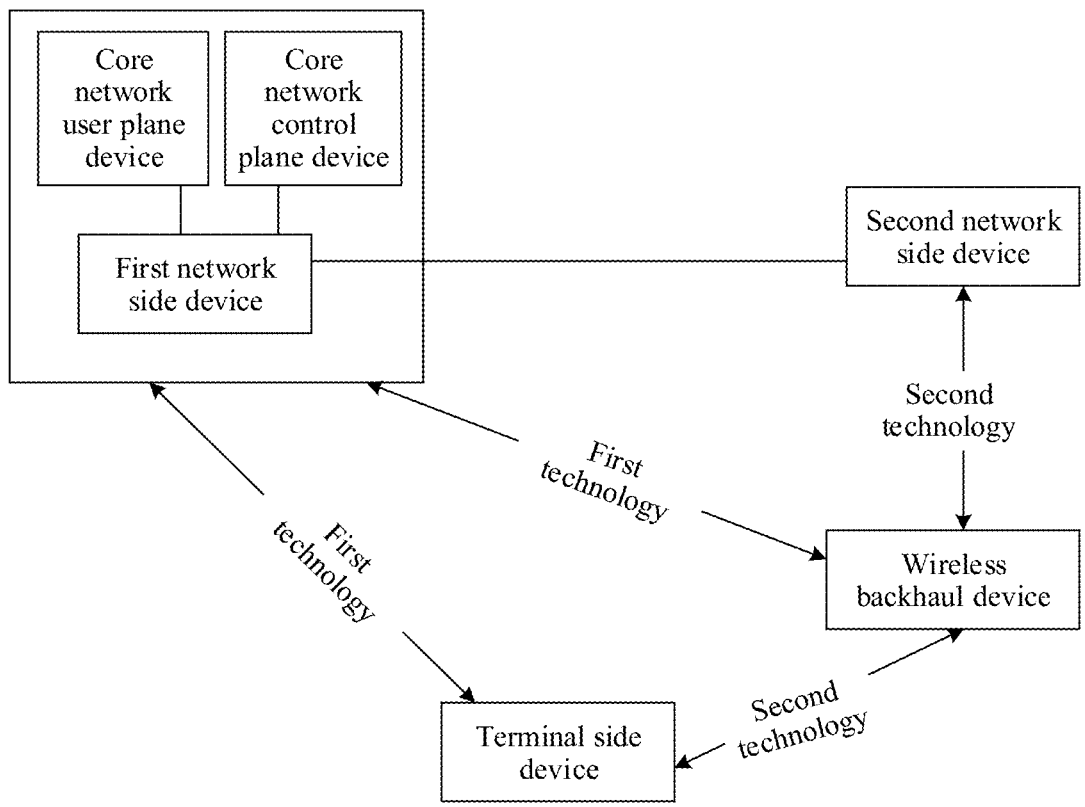
FIG. 5A is a schematic diagram of a system architecture according to a fourth embodiment of this application.
Figure 5B:
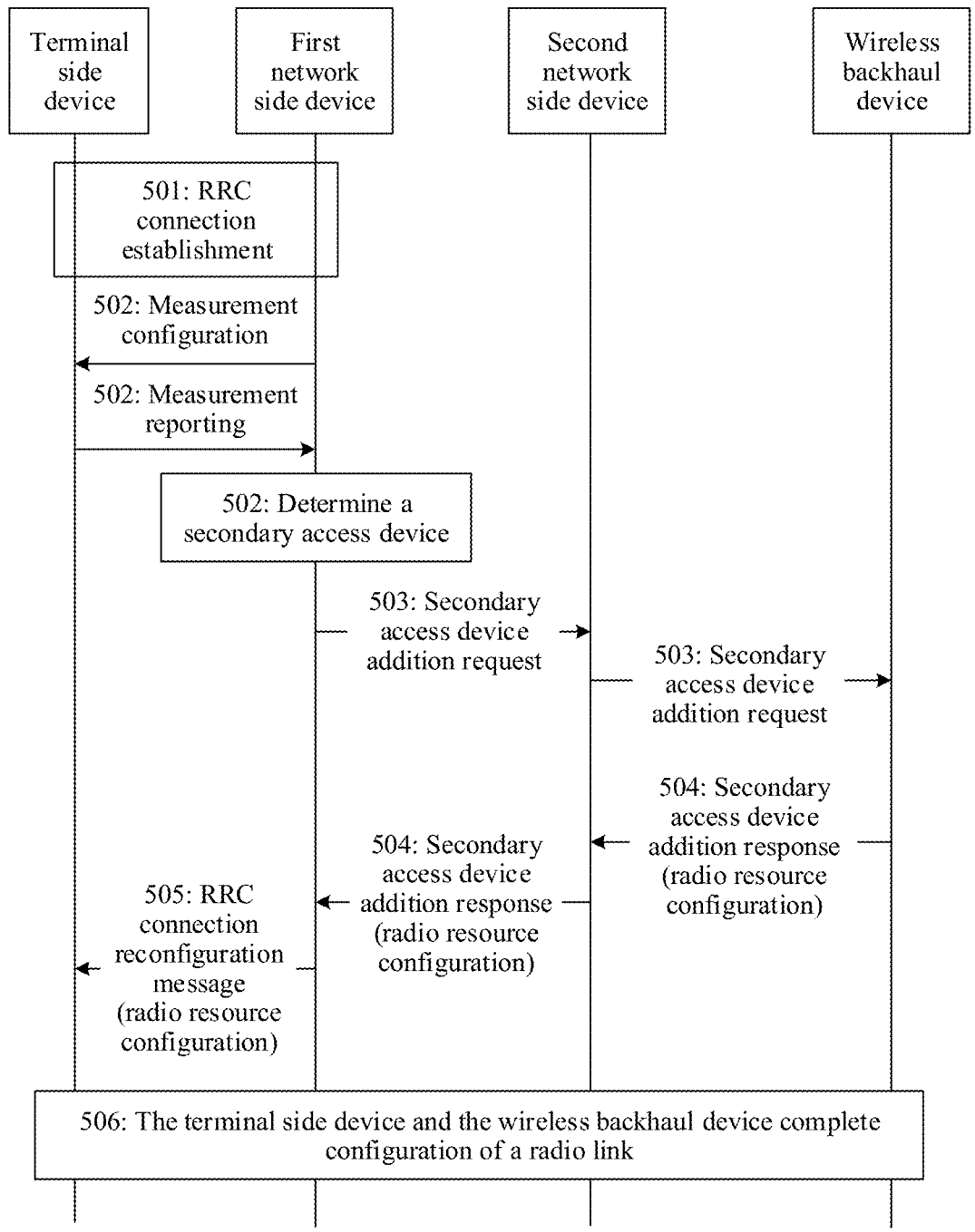
FIG. 5B is a schematic diagram of system interaction that is based on the system architecture shown in FIG. 5A according to a fourth embodiment of this application.

A fourth embodiment of this application provides a wireless backhaul communication processing method. A schematic diagram of a system architecture shown in FIG. 5A and a schematic diagram of system interaction shown in FIG. 5B include the following content.

501: A terminal side device establishes an RRC connection to a first network side device through a random access process.

502: The first network side device sends a measurement configuration to the terminal side device, and selects, based on a measurement result reported by the terminal side device, a wireless backhaul device as a secondary access device of the terminal side device, where the first network side device is a primary access device of the terminal side device.

In 502, optionally, the first network side device and the wireless backhaul device may have a same network technology, or may have different network technologies. The first network side device and the wireless backhaul device adopt a same network technology, for example, the LTE technology or the NR technology. Alternatively, the first network device and the wireless backhaul device adopt different network technologies, for example, the first network device adopts the LTE technology, and the wireless backhaul device adopts the NR technology.

The first network side device may further select a second network side device for the wireless backhaul device based on the measurement result. Specifically, the first network side device finds the corresponding second network side device based on a cell identifier of the wireless backhaul device reported by the terminal side device and also based on a previously obtained association relationship between the wireless backhaul device and the second network side device. For example, the first network side device may learn, based on a network side device identifier included in the cell identifier of the wireless backhaul device, that a cell of the wireless backhaul device is a cell of the second network side device.

503: The first network side device sends, to the wireless backhaul device through the second network side device connected to the wireless backhaul device, a secondary access device addition request message, for example, SgNB Addition Request, to request the wireless backhaul device to serve as a secondary access device of the terminal side device.

504: The wireless backhaul device sends, to the first network side device through the second network side device, a secondary access device addition response message, for example, SgNB Addition Request Acknowledge, where the response message includes a radio resource configuration between the wireless backhaul device and the terminal side device.

Figure 5C:
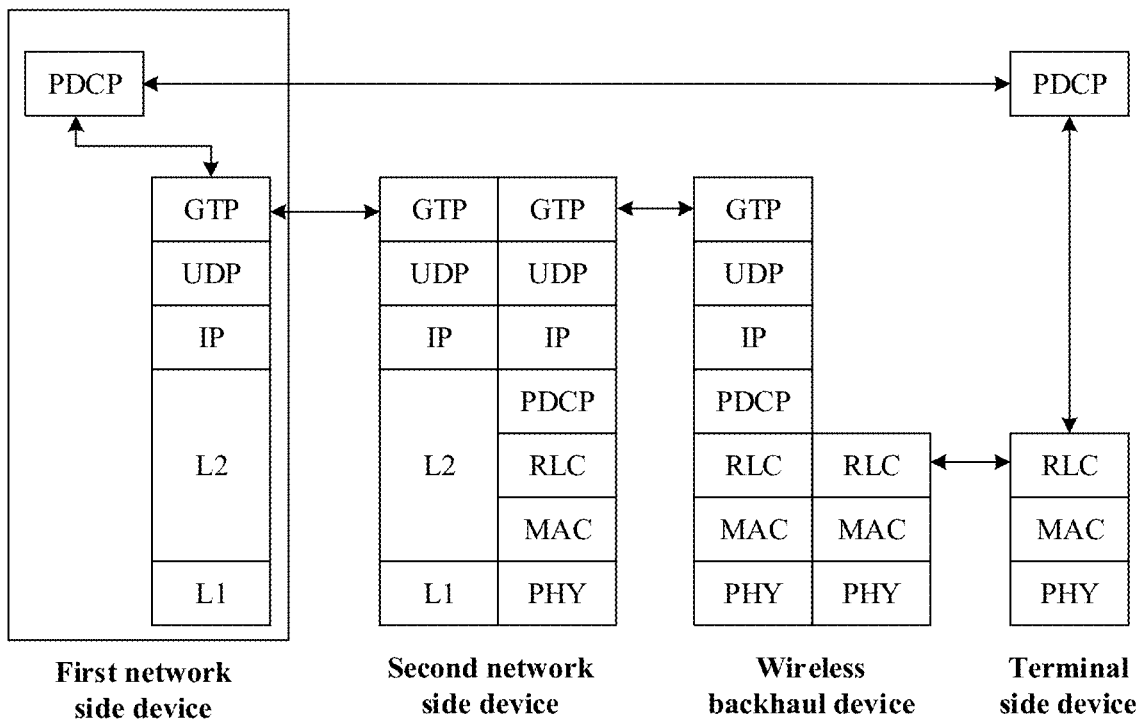
FIG. 5C is a schematic architectural diagram of a protocol stack that is based on FIG. 5A according to a fourth embodiment of this application.

In steps 503 and 504, a GTP tunnel corresponding to a user data bearer is established, for the terminal side device, between the first network side device and the second network side device, and a GTP tunnel corresponding to the user data bearer is further established, for the terminal side device, between the second network side device and the wireless backhaul device. In addition, as shown in FIG. 5C, the two GTP tunnels have a one-to-one correspondence. GTP is an abbreviation for a general packet radio service tunneling protocol layer, and UDP is an abbreviation for a user datagram protocol layer.

505: The first network side device sends the radio resource configuration to the terminal side device.

506: The terminal side device completes configuration of a link between the terminal side device and the wireless backhaul device based on the radio resource configuration.

According to the technical solution provided in the fourth embodiment of this application, the second network side device (particularly, a non-standalone network side device) may use the wireless backhaul device connected to the second network side device, as the secondary access device of the terminal side device, thereby implementing dual connectivity of the terminal side device.

Figure 6:
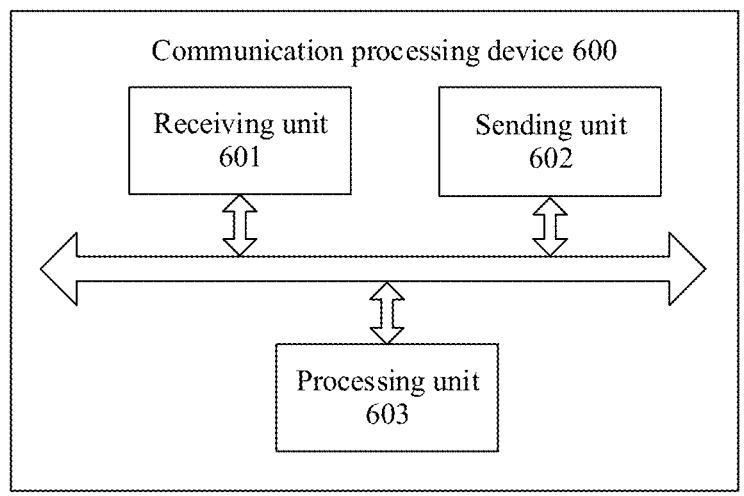
FIG. 6 is a schematic structural diagram of units of a communication processing device according to a fifth embodiment of this application.

A fifth embodiment of this application provides a communication processing apparatus 600. FIG. 6 is a schematic structural diagram of units of the communication processing apparatus. The communication processing apparatus 600 includes a receiving unit 601, a sending unit 602, and a processing unit 603.

The communication processing apparatus 600 provided in the fifth embodiment of this application may be a wireless backhaul device, configured to implement the method performed by the wireless backhaul device in any one of the first embodiment, the second embodiment, the third embodiment, and the fourth embodiment. Specifically, the receiving unit 601 is configured to perform a receiving action of the wireless backhaul device, the sending unit 602 is configured to perform a sending action of the wireless backhaul device, and the processing unit is configured to perform a processing action of the wireless backhaul device. For details, refer to the content described in the first embodiment, the second embodiment, the third embodiment, and the fourth embodiment.

The communication processing apparatus 600 provided in the fifth embodiment of this application may alternatively be a network side device, configured to implement the method performed by the first network side device or the second network side device in any one of the first embodiment, the second embodiment, the third embodiment, and the fourth embodiment. Specifically, the receiving unit 601 is configured to perform a receiving action of the network side device, the sending unit 602 is configured to perform a sending action of the network side device, and the processing unit is configured to perform a processing action of the network side device. For details, refer to the content described in the first embodiment, the second embodiment, the third embodiment, and the fourth embodiment.

Figure 7:
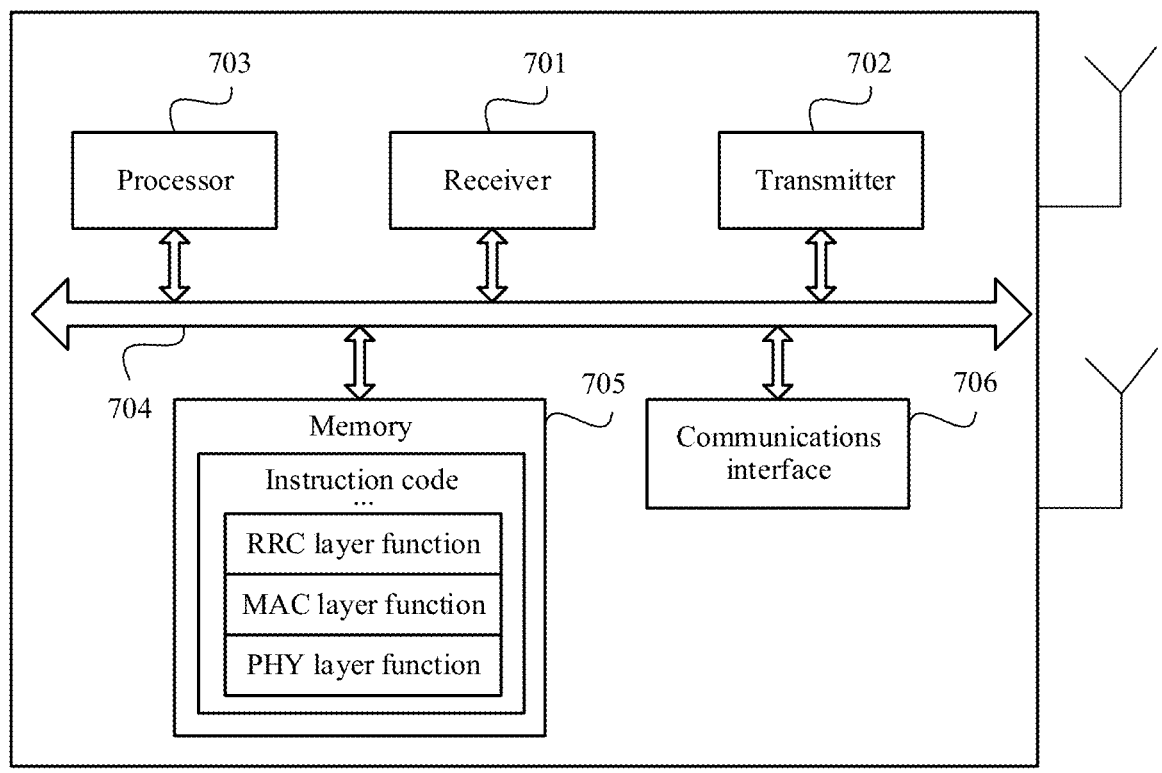
FIG. 7 is a schematic structural diagram of hardware of a communication processing device according to a fifth embodiment of this application.

In specific hardware implementation, as shown in a schematic structural diagram of hardware of the communication processing apparatus in FIG. 7, a function of the receiving unit 601 may be specifically implemented by a receiver 701, a function of the sending unit 602 may be implemented by a transmitter 702, and a function of the processing unit 703 may be specifically implemented by a processor 703. The communication processing apparatus may further include various electronic components or interconnects, for example, a bus 704, a memory 705, and/or a communications interface 706. The memory 705 may include instruction code. When the instruction code is invoked by the processor 703, the instruction code is used to implement the method performed by the first network side device, the second network side device, or the wireless backhaul device in any one of the first embodiment, the second embodiment, the third embodiment, and the fourth embodiment. The instruction code includes a data structure used to implement functions of protocol layers (e.g., an RRC layer, a MAC layer, and a PHY layer).

The communications interface 706 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a wireless local area network interface.

The bus 704 may be a peripheral component interconnect (PCI) bus, an extended industry standard architecture (EISA) bus, or the like. The bus 704 may be classified into an address bus, a data bus, a control bus, and the like.

A person skilled in the art should understand that an embodiment of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to flowcharts and/or block diagrams of the method, the apparatus (system), and the computer program product according to the embodiments of this application. It should be understood that each procedure and/or each block in the flowcharts and/or the block diagrams and a combination of a procedure and/or a block in the flowcharts and/or the block diagrams may be implemented by using computer program instructions. The computer program instructions may be provided for a general-purpose computer, a special-purpose computer, an embedded processor, or a processor of another programmable data processing device, to form a machine, so that the instructions executed by a computer or the processor of the another programmable data processing device generate an apparatus for implementing a function specified in one or more procedures in the flowcharts and/or in one or more blocks in the block diagrams.

The computer program instructions may alternatively be stored in a computer-readable memory that can direct the computer or the another programmable data processing device to work in a specific manner, so that the instructions stored in the computer-readable memory generate an artifact that includes an instruction apparatus. The instruction apparatus implements a function specified in one or more procedures in the flowcharts and/or in one or more blocks in the block diagrams.

The computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a function specified in one or more processes in the flowcharts and/or in one or more blocks in the block diagrams.

What is claimed is:

1. A wireless backhaul communication processing method, comprising:
determining, by a first network side device, a second network side device as a secondary access device of a wireless backhaul device for dual connectivity in which the wireless backhaul device is connected to the first network side device as a primary access device and to the second network side device as the secondary access device, wherein the wireless backhaul device is configured to provide a terminal side device with a data backhaul connecting to the first network side device and a data backhaul connecting to the second network side device; and
sending, by the first network side device, a secondary access device addition request message carrying first information to the second network side device for the dual connectivity, wherein the first information indicates that the wireless backhaul device performs access.

2. The method according to claim 1, further comprising:
receiving, by the first network side device from the second network side device, a secondary access device addition response message carrying configuration information generated by the second network side device, wherein the configuration information configures a radio link between the wireless backhaul device and the second network side device.

3. The method according to claim 2, wherein the first information is carried in the secondary access device addition request message that is a secondary next generation node B (SgNB) addition request message; and wherein the configuration information is carried in the secondary access device addition response message is an SgNB addition request acknowledge message.

4. The method according to claim 1, further comprising:
before the sending, by the first network side device, the secondary access device addition request message carrying the first information to the second network side device, receiving, by the first network device, second information sent by the wireless backhaul device, wherein the second information indicates that the wireless backhaul device performs access.

5. The method according to claim 1, further comprising:
receiving, by the first network side device, third information sent by the second network side device, wherein the third information indicates an association relationship between the second network side device and a cell of the wireless backhaul device, an association relationship between a cell of the second network side device and a cell of the wireless backhaul device, or an association relationship between a cell of the second network side device and the wireless backhaul device.

6. A first network side device, comprising: a memory storing instructions and a processor, wherein the instructions are executed by the processor to make the first network side device perform a method comprising:
determining a second network side device as a secondary access device of a wireless backhaul device for dual connectivity in which the wireless backhaul device is connected to the first network side device as a primary access device and to the second network side device as the secondary access device, wherein the wireless backhaul device is configured to provide a terminal side device with a data backhaul connecting to the first network side device and a data backhaul connecting to the second network side device; and
sending a secondary access device addition request message carrying first information to the second network side device for the dual connectivity, wherein the first information indicates that the wireless backhaul device performs access.

7. The device according to claim 6, wherein the method further comprises:
receiving from the second network side device, a secondary access device addition response message carrying configuration information generated by the second network side device, wherein the configuration information configures a radio link between the wireless backhaul device and the second network side device.

8. The device according to claim 7, wherein the first information is carried in the secondary access device addition request message that is a secondary next generation node B (SgNB) addition request message; and wherein the configuration information is carried in the secondary access device addition response message that is an SgNB addition request acknowledge message.

9. The device according to claim 6, wherein the method further comprising:
before the sending of the secondary access device addition request message carrying the first information to the second network side device, receiving, second information sent by the wireless backhaul device, wherein the second information indicates that the wireless backhaul device performs access.

10. The device according to claim 6, wherein the method further comprises:
receiving third information sent by the second network side device, wherein the third information indicates an association relationship between the second network side device and a cell of the wireless backhaul device, an association relationship between a cell of the second network side device and a cell of the wireless backhaul device, or an association relationship between a cell of the second network side device and the wireless backhaul device.

11. A wireless communications system, comprising: a first network side device, a second network side device, and a wireless backhaul device, wherein the wireless backhaul device is connected to a core network device of the second network side device through a radio link with the second network side device, and wherein
the wireless backhaul device is configured to:
receive system information sent by the second network side device, wherein the system information comprises information indicating only the wireless backhaul device to be allowed to access, and information indicating a random access resource used by the wireless backhaul device to access the second network side device, wherein the wireless backhaul device is configured to provide a terminal side device with a data backhaul connecting to the second network side device; and
initiate a random access process to the second network side device based on the system information to establish the radio link with the second network side device; and
wherein the second network side device is configured to:
send the system information to the wireless backhaul device.

12. The system according to claim 11, wherein
the wireless backhaul device is further configured to send, in the random access process or after the random access process is completed, the following indication information to the second network side device:
information indicating that the wireless backhaul device performs access.

13. The system according to claim 11, wherein:
the wireless backhaul device is further configured to send a notification to the second network side device, wherein the notification indicates an association relationship between the second network side device and a cell of the wireless backhaul device, an association relationship between a cell of the second network side device and a cell of the wireless backhaul device, or an association relationship between a cell of the second network side device and the wireless backhaul device.

14. The system according to claim 11, wherein:
the second network side device is configured to receive, in the random access process or after the random access process is completed, the following indication information and that is sent by the wireless backhaul device:
information indicating that the wireless backhaul device performs access.

15. The system according to claim 11, wherein:
the second network side device is configured to receive, in the random access process or after the random access process is completed, a notification sent by the wireless backhaul device, wherein the notification indicates an association relationship between the second network side device and a cell of the wireless backhaul device, an association relationship between a cell of the second network side device and a cell of the wireless backhaul device, or an association relationship between a cell of the second network side device and the wireless backhaul device.

16. The system according to claim 11, wherein:
the second network side device is further configured to send a notification to the first network side device, wherein the notification indicates the association relationship between the second network side device and the cell of the wireless backhaul device, the association relationship between the cell of the second network side device and the cell of the wireless backhaul device, or the association relationship between the cell of the second network side device and the wireless backhaul device.

17. A second network side device, comprising:
a memory storing instructions; and
a processor;
wherein the instructions are executed by the processor to configure the second network side device to perform a method comprising:
receiving from a first network side device, a secondary access device addition request message for dual connectivity in which a wireless backhaul device is connected to the first network side device as a primary access device and to the secondary access device as a secondary access device, wherein the wireless backhaul device is configured to provide a terminal side device with a data backhaul connecting to the first network side device and a data backhaul connecting to the second network side device and the secondary access device addition request message carries first information indicating that the wireless backhaul device performs access; and
sending to the first network side device, a secondary access device addition response message carrying configuration information which configures a radio link between the wireless backhaul device and the second network side device.

18. The device according to claim 17, wherein the secondary access device addition request message is a secondary next generation node B (SgNB) addition request message and the secondary access device addition response message is an SgNB addition request acknowledge message.

19. The device according to claim 17, wherein the method further comprises:
sending to the first network side device, information indicating an association relationship between the second network side device and a cell of the wireless backhaul device, an association relationship between a cell of the second network side device and a cell of the wireless backhaul device, or an association relationship between a cell of the second network side device and the wireless backhaul device.

* * * * *

UNITED STATES PATENT AND TRADEMARK OFFICE
CERTIFICATE OF CORRECTION

| | |
|---|---|
| PATENT NO. | : 11,832,322 B2 |
| APPLICATION NO. | : 16/994026 |
| DATED | : November 28, 2023 |
| INVENTOR(S) | : Liu et al. |

It is certified that error appears in the above-identified patent and that said Letters Patent is hereby corrected as shown below:

In the Claims

Claim 1: Column 20, Line 60: "cates that the wireless backhaul device performs" should read -- cates that it is the wireless backhaul device to perform --.

Claim 4: Column 21, Lines 16-17: "wherein the second information indicates that the wireless backhaul device performs access." should read -- wherein the second information indicates that it is the wireless backhaul device to perform access. --.

Claim 6: Column 21, Lines 45-46: "information indicates that the wireless backhaul device performs access." should read -- information indicates that it is the wireless backhaul device to perform access. --.

Claim 9: Column 22, Lines 1-2: "wherein the second information indicates that the wireless backhaul device performs access." should read -- wherein the second information indicates that it is the wireless backhaul device to perform access. --.

Claim 12: Column 22, Lines 43-44: "information indicating that the wireless backhaul device performs access." should read -- information indicating that it is the wireless backhaul device to perform access. --.

Claim 14: Column 22, Lines 60-61: "information indicating that the wireless backhaul device performs access." should read -- information indicating that it is the wireless backhaul device to perform access. --.

Claim 17: Column 24, Lines 6-7: "tion indicating that the wireless backhaul device performs access; and" should read -- tion indicating that it is the wireless backhaul device to perform access; and --.

Signed and Sealed this
Fifth Day of March, 2024

Katherine Kelly Vidal
*Director of the United States Patent and Trademark Office*